United States Patent
Sonoda et al.

(10) Patent No.: US 8,738,866 B2
(45) Date of Patent: May 27, 2014

(54) STORAGE SYSTEM AND CONTROL METHOD THEREFOR

(75) Inventors: Koji Sonoda, Chigasaki (JP); Go Uehara, Odawara (JP)

(73) Assignee: Hitachi, Ltd., Tokyo (JP)

( * ) Notice: Subject to any disclaimer, the term of this patent is extended or adjusted under 35 U.S.C. 154(b) by 191 days.

(21) Appl. No.: 13/510,492

(22) PCT Filed: May 2, 2012

(86) PCT No.: PCT/JP2012/002971
§ 371 (c)(1),
(2), (4) Date: May 17, 2012

(87) PCT Pub. No.: WO2013/164869
PCT Pub. Date: Nov. 7, 2013

(65) Prior Publication Data
US 2013/0297856 A1    Nov. 7, 2013

(51) Int. Cl.
G06F 12/00       (2006.01)
G06F 12/02       (2006.01)
G06F 3/06        (2006.01)

(52) U.S. Cl.
CPC .......... *G06F 12/0238* (2013.01); *G06F 3/0613* (2013.01); *G06F 3/0625* (2013.01); *G06F 3/0659* (2013.01); *G06F 3/0679* (2013.01)
USPC .......................................... 711/154; 711/114

(58) Field of Classification Search
CPC . G06F 12/0238; G06F 3/0613; G06F 3/0625; G06F 3/0659; G06F 3/0679
USPC ................................. 711/114, 154
See application file for complete search history.

(56) References Cited

U.S. PATENT DOCUMENTS

2009/0265506 A1* 10/2009 Yim .............................. 711/103
2010/0049905 A1    2/2010 Ouchi
2012/0023346 A1    1/2012 Byom et al.
2013/0297894 A1* 11/2013 COHEN et al. ............... 711/154

FOREIGN PATENT DOCUMENTS

JP           2010-049586 A     3/2010

OTHER PUBLICATIONS

PCT International Search Report and Written Opinion on application PCT/JP2012/002971 mailed Nov. 9, 2012; 9 pages.

* cited by examiner

*Primary Examiner* — Reba I Elmore
(74) *Attorney, Agent, or Firm* — Foley & Lardner LLP

(57) ABSTRACT

A storage system comprises multiple memory packages and a storage controller. The multiple memory packages respectively comprise multiple nonvolatile semiconductor memory devices for storing data, and a memory controller for controlling the reading/writing of data from/to these multiple semiconductor memory devices, and the storage controller receives an I/O command issued from a host computer, creates, on the basis of the received I/O command, a first level command for controlling the multiple memory packages, and sends this first level command to the multiple memory packages. The memory controllers of the multiple memory packages create a second level command for the multiple nonvolatile semiconductor memory devices inside its own memory package, and estimate the power to be consumed in its own memory package. In a case where the estimated power consumption exceeds a preconfigured permissible power, suspends the execution of the received second level command.

15 Claims, 27 Drawing Sheets

LU configuration table
2205

| LUN | LU size | Area range | Operation rate upper limit |
|---|---|---|---|
| 0 | 0x10000000 | aaa | 30% |
| 1 | 0x10000000 | bbb | 5% |
| 2 | 0x40000000 | ccc | 5% |

Fig. 26

Command list
2508

| 2801 Command type | READ | READ | READ | READ |
|---|---|---|---|---|
| 2802 LPA | 0x00 | 0x10 | 0x20 | 0x30 |
| 2803 Buffer address | 0x00120000 | 0x00122000 | 0x00124000 | 0x00126000 |
| 2804 PPA | 0x101 | 0x001 | 0x201 | 0x121 |
| 2805 Chip number | 1 | 0 | 2 | 1 |

Fig. 27

Power consumption table
2505

| Component name | Power (W) 2902 | Number installed 2903 | Number in operation 2904 | Power subtotal 2905 |
|---|---|---|---|---|
| Higher-level I/F | 5 | 1 | 1 | 5 |
| CPU | 4 | 2 | 1 | 4 |
| FM chip | 0.125 | 1024 | 40 | 5 |
| 2906 Total power | | | | 14 |
| 2907 Operation rate upper limit | | | | 50% |

(column header 2901 = Component name)

Fig. 28

FM chip operation table
2506

| 3001 Chip number | 0 | 1 | 2 | 3 | 4 | 5 | ... |
|---|---|---|---|---|---|---|---|
| 3002 Execution in progress | 1 | 0 | 0 | 1 | 1 | 0 | ... |
| 3003 Next command | 1 | 1 | 0 | 0 | 1 | 0 | ... |
| 3004 Prospect | 1 | 1 | 0 | 1 | 1 | 0 | ... |

X=number in operation
Y=Power subtotal

X=number in operation
Y=Power subtotal

STORAGE SYSTEM AND CONTROL METHOD THEREFOR

TECHNICAL FIELD

The present invention relates to a storage system comprising multiple nonvolatile semiconductor storage media, and a control method therefor.

BACKGROUND ART

A storage system generally provides a higher-level apparatus (for example, a host computer) with a logical volume, which is created based on a RAID (Redundant Array of Independent Disks) group configured from multiple storage devices. In recent years, a nonvolatile semiconductor storage apparatus comprising multiple nonvolatile chips has been used as the storage device either in addition to or instead of a HDD (Hard Disk Drive). As a nonvolatile semiconductor storage device, for example, a flash memory comprising multiple flash memory chips (hereinafter, FM chip) is used.

Larger capacity and higher performance are required in a storage system equipped with flash memory like this. However, when high-speed processors and flash memory chips are augmented to meet this requirement, there is the likelihood that the power consumption of the storage system as a whole will increase, and that this power consumption will exceed the power capable of being provided by the facility in which the storage system is installed. For this reason, it is necessary to reduce power consumption while realizing increased capacity and higher performance in the storage system, and, for example, technology for computing a number of FM chips, which can be processed in parallel by a controller, which controls the entire storage system, and for a FM chip controller to control the number of FM chips on the basis of the relevant computation result, is disclosed in Patent Literature 1.

CITATION LIST

Patent Literature

PTL 1: Japanese Patent Application Laid-open No. 2010-049586

SUMMARY OF INVENTION

Technical Problem

However, in the method disclosed in the above-mentioned Patent Literature 1, since the controller, which controls the storage system as a whole, computes the number of FM chips being processed in parallel, it is not possible to take into account the power being consumed by a controller mounted inside a flash memory package (hereinafter, FMPK) comprising the FM chips, or the number of FM chips being used in accordance with the processing being performed inside the FMPK, making it impossible to accurately discern the power consumption of the FMPK. Therefore, as a result of the power consumed in accordance with the internal processing of the FMPK, there is the likelihood of the power consumption of the storage system as a whole exceeding the maximum power consumption, and of the number of FM chips capable of parallel processing being limited despite the fact that the power consumption of the storage system as a whole is still well below the maximum power consumption, making it impossible to achieve full performance.

Solution to Problem

A storage system comprises multiple memory packages and a storage controller. The multiple memory packages respectively comprise multiple nonvolatile semiconductor memory devices for storing data, and a memory controller for controlling the reading/writing of data from/to these multiple semiconductor memory devices, and the storage controller receives an I/O command issued from a host computer, creates, on the basis of the received I/O command, a first level command for controlling the multiple memory packages, and sends this first level command to the multiple memory packages. The memory controllers of the multiple memory packages, based on the received first level command, respectively create a second level command for the multiple nonvolatile semiconductor memory devices inside its own memory package, and estimate the power to be consumed in its own memory package when the created second level command is executed. Then, in a case where the estimated power consumption exceeds a preconfigured permissible power, the memory controllers of the multiple memory packages suspends the execution of the received second level command.

BRIEF DESCRIPTION OF DRAWINGS

FIG. 26 shows an example of the configuration of a command list related to the example.

FIG. 27 shows an example of the configuration of a power consumption table related to the example.

FIG. 28 shows an example of the configuration of a FM chip operation table related to the example.

DESCRIPTION OF EMBODIMENTS

Figure 1:
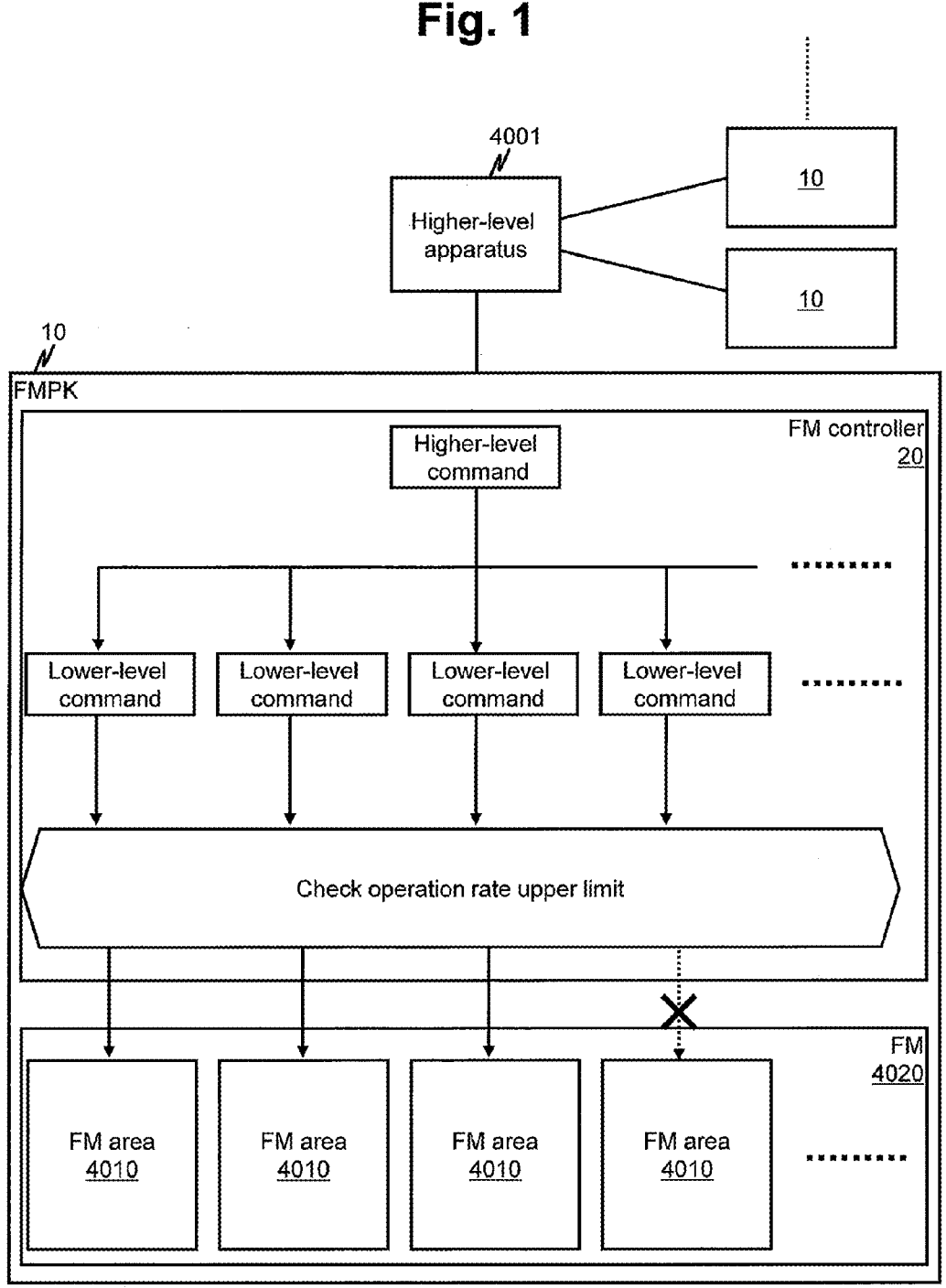
FIG. 1 shows an overview of an example.

An example will be explained below by referring to the drawings.

In the following explanation, various types of information may be explained using the expression "aaa table" or "aaa list", but the various information may also be expressed using a data structure other than a table or a list. To show that the various information is not dependent on the data structure, "aaa table" and "aaa list" can be called "aaa information".

In the following explanation, when providing an explanation that distinguishes between same type elements, a combination of an element name and identification information may be used instead of a combination of the element name and a reference sign. For example, a switch having the identification information (identification number) "0" may be written as "switch #0".

In the following explanation, a communication interface device may be abbreviated as "I/F".

In the following explanation, it is supposed that a nonvolatile semiconductor memory is a flash memory. It is supposed that this flash memory is the type of flash memory in which an erase is performed in units of blocks and an access is performed in units of pages, i.e., a typical NAND-type flash memory. However, the flash memory may be another type flash memory (for example, a NOR type) instead of the NAND type. Furthermore, another type of nonvolatile semiconductor memory, for example, a phase-change memory, may be used instead of flash memory.

In the following explanation, since the nonvolatile semiconductor memory is a NAND-type flash memory as explained above, the terms page and block are used, and, in addition, data cannot be overwritten on the same page. In a case where a certain logical area (will be referred to as the "target logical area" in this paragraph) is a write destination, and, in addition, a page (will be referred to as the "first page" in this paragraph) is already allocated to the target logical area and data is stored in the first page, a free page (will be referred to as the "second page" in this paragraph) is allocated to the target logical area instead of the first page, and data is written to the second page. The data written to the second page is the latest data with respect to the target logical page, and the data stored in the first page is old data with respect to the target logical page. Hereinbelow, for each logical area, the latest data may be called "valid data" and the old data may be called "invalid data". In addition, a page storing valid data may be called a "valid page", and a page storing invalid data may be called an "invalid page".

A management system may comprise one or more computers. Specifically, for example, in a case where a management computer comprises a display device and displays information on this display device, or, in a case where a remote computer comprises a display device and information is displayed on the display device of the remote computer in accordance with the management computer sending display information to this remote computer, the management computer is the management system. Also, for example, in a case where the same functions as those of the management computer are realized using multiple computers, the relevant multiple computers (may include a display computer when a display is performed by the display computer) are the management system. In the example, the management computer is the management system. Furthermore, the act of "displaying" on the part of a control device (for example, a computer comprising this control device) may be both an act in which the computer displays information on the display device of this computer, and an act in which the computer sends information to be displayed to a different computer, which comprises a display device, to be displayed on this display device.

Example 1

FIG. 1 shows an overview of an example.

a higher-level apparatus 4001 are coupled to multiple flash memory packages (hereinafter, FMPK) 10. The higher-level apparatus 4001 sends an I/O (Input/Output) command specifying a logical address to the FMPK 10. The FMPK 10, for example, is a SSD (Solid State Device). In this example, the higher-level apparatus 4001 is a RAID (Redundant Array of Independent (or Inexpensive) Disks) controller 301 (for example, refer to FIG. 3), which will be described further below, but may be another device instead, for example, a host 200.

The FMPK 10 comprises a flash memory (FM) 4020, and a controller (hereinafter, FM controller) 20 coupled to the FM 4020. The FM 4020 comprises multiple FM areas 4010. The FM area 4010 comprises multiple blocks. Each block comprises multiple pages. Data is erased in units of blocks, and data I/O is performed in units of pages.

The FM controller 20 receives an I/O command from the higher-level apparatus 4001. This I/O command is an example of a "higher-level command" in the FM controller 20. As another example of the higher-level command, there is an internal process command, which is processing via which the FM controller 20 performs an I/O with respect to the FM 4020 without a command from the higher-level apparatus 4001. As internal processes, for example, there is a reclamation process and a refresh process (These processes will be explained further below).

The FM controller 20 may create multiple lower-level commands, which are respectively sent to multiple FM areas 4010 on the basis of a single higher-level command. The lower-level command, for example, is an I/O command. More specifically, for example, one or more pages, typically, multiple pages may be allocated to a logical address specified in a single higher-level command. Then, these multiple pages may exist in multiple FM areas 4010. For this reason, the FM controller 20 may create multiple I/O commands (lower-level commands) for performing data I/O to each of multiple pages.

The power consumption of the FMPK 10 is related to the number of FM areas 4010 in operation (the number of FM areas 4010, which receive a lower-level command and process this lower-level command) more than the number of FM areas 4010 installed (the number of installed FM areas 4010). In order to enhance the I/O performance of an FMPK 10 while curbing the power consumption of the FMPK 10, having the power consumption of the FMPK 10 get as close as possible to a permissible power while still curbing the power consumption of the FMPK 10 to equal to or less than the permissible power (preferably making the power consumption of the FMPK 10 the same as the permissible power) will be considered.

One conceivable method for realizing this is for the higher-level apparatus 4001 to control the number of FM areas 4010 in operation. However, at least one of the problems of (1) through (3) below is possible in this case.

(1) The higher-level apparatus 4001 is unable to discern the corresponding relationship between a logical address and a physical address in the FMPK 10 without possessing mapping information of an enormous size.

(2) The higher-level apparatus 4001 is unable to learn whether or not an internal process is being performed in the FMPK 10. For this reason, the number of FM areas 4010 in operation cannot be accurately controlled. Therefore, there is the likelihood that performance will drop more than necessary as a result of not being able to consume power as close to the permissible power as possible, or that power consumption will exceed the permissible power.

(3) The load of the higher-level apparatus 4001 increases.

Consequently, in the example, the FM controller 20 controls the number of FM areas 4010 in operation, that is, the number of lower-level commands to be processed in parallel in each FMPK 10 such that the power consumption of FMPK 10 is equal to or less than the permissible power. Preferably, the number of FM areas 4010 in operation is controlled such that the power consumption of the FMPK 10 is as close as possible to (more preferably, the same as) the permissible power of the FMPK 10.

Specifically, for example, the FM controller 20, based on which FM areas 4010 are operating and which of these FM areas 4010 are destinations for multiple lower-level commands, the rate of operation of the FM areas 4010 (the ratio of the number of operating FM areas 4010 with respect to the total number of FM areas 4010), and a operation rate upper limit, which conforms to the permissible power, adjusts the number of lower-level commands issued in parallel such that the rate of operation of the FM areas 4010 is equal to or less than the operation rate upper limit even though a FM area 4010 is put into operation anew in accordance with sending a lower-level command.

The FM controller 20 in each FMPK 10, in accordance with adjusting the number of parallel commands (the number of lower-level commands being processed in parallel (that is, the number of FM areas 4010 in operation)), is able to adjust the power consumption of the FMPK 10 to an appropriate power consumption. Specifically, in the FMPK 10, since an upper-level command, which conforms to an internal process (for example, a reclamation process, a refresh process, or the like) is issued, and although the upper-level apparatus 4001 is unable to discern the issuing of this upper-level command, a lower-level command, which is adjusted by the FM controller 20, is generated based on this upper-level command as well, the power consumption of the FMPK 10 can be adjusted to an appropriate power consumption. The adjustment of the number of parallel commands like this is performed by the FM controller 20 rather than the higher-level apparatus 4001, and as such the higher-level apparatus 4001 can get by without being subjected to a large load.

In the example, the FM controller 10 adjusts the number of parallel commands, but in a case where there is a flash memory device (hereinafter, FMD) comprising multiple FMPKs 10, and, in addition, this FMD comprises a controller (hereinafter, FMD controller), which is coupled to the multiple FMPKs 10, the FMD controller may adjust the number of parallel commands instead of the FM controller 20. In accordance with this, the upper-level apparatus of the FM controller 20 may be the FMD controller, or the upper-level apparatus of the FMD controller may be the higher-level apparatus 4001 shown in FIG. 1.

The smallest unit of the FM area 4010 may be the unit, which is unable to receive another lower-level command while receiving and processing one lower-level command. In the example, the FM area 4010 is a single FM chip, but may be another type unit instead, for example, a FM chip group (for example, a DIMM (Dual Inline Memory Module)).

In the above explanation, the rate of operation of the FM area 4010 is compared to an operation rate upper limit, but the operation rate upper limit may be an example of a power consumption upper limit unit. For example, the FM power consumption (the product of power consumption of the total number of operating FM areas 4010 and the power consumption per FM area 4010) may be compared to a power consumption upper limit, and the sum of the FM power consumption and another power consumption (for example, the power consumption of the FM controller) related to the FMPK 10 may be compared to the power consumption upper limit. That is, the power consumption upper limit may be a threshold with respect to the FM 4020, or may be a threshold with respect to the FMPK 10 as a whole.

Next, the example will be explained in detail.

Figure 2:
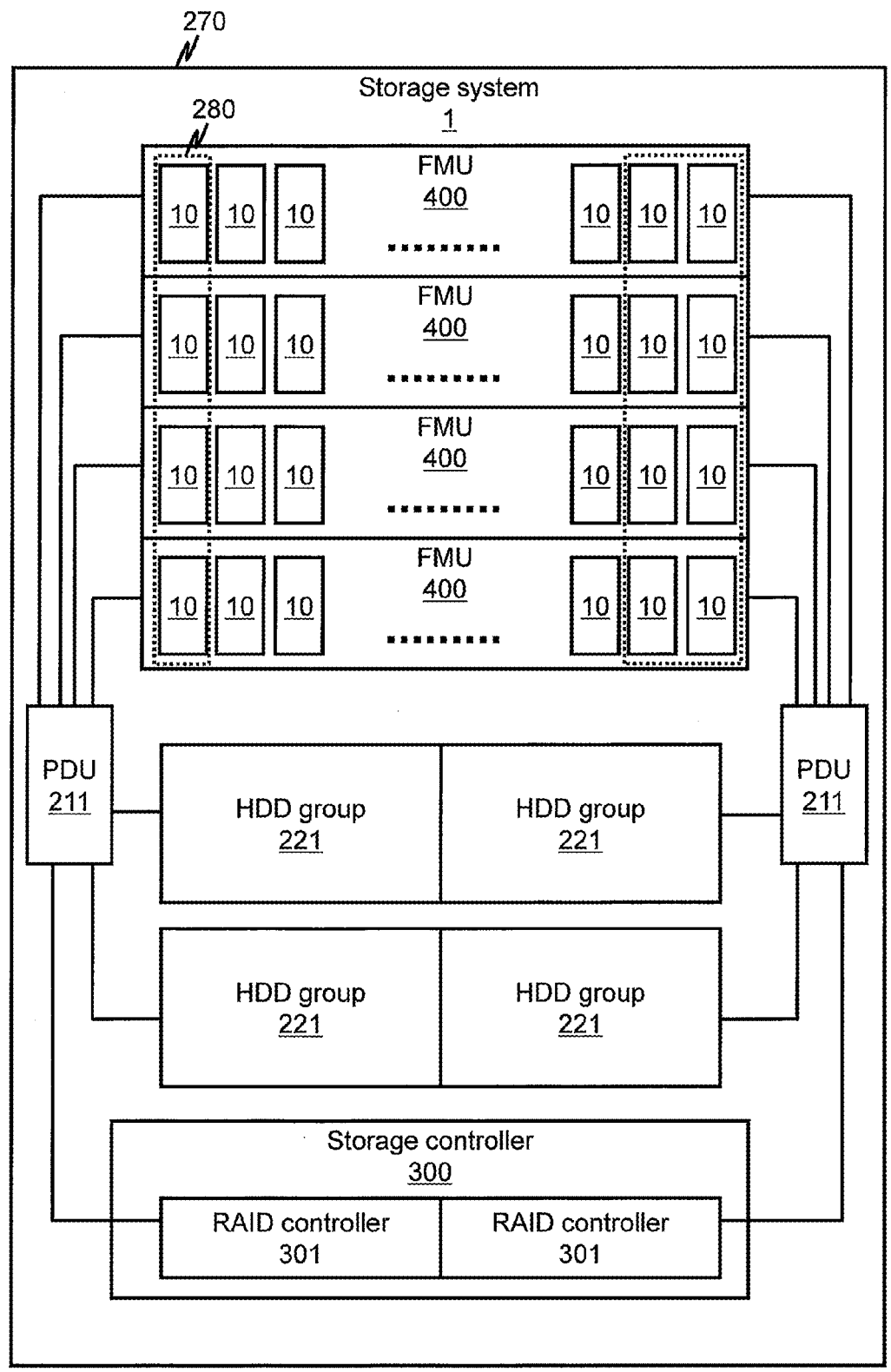
FIG. 2 shows an example of the configuration of a storage system related to the example.

FIG. 2 shows an example of the configuration of a storage system related to the example.

A storage system 1 comprises an enclosure 270. Multiple FMUs 400, multiple HDD groups 221, a storage controller 300, and multiple PDUs (Power Distribution Units) 211 are mounted in the enclosure 270.

Each FMU 400 comprises multiple FMPKs 10. The multiple FMUs 400 are arrayed in the height direction of the enclosure 270. A RAID group (hereinafter, RG) 280 may be configured from multiple FMPKs 10, and the multiple FMPKs 10 comprising the RG 280 may exist in different multiple FMUs 400.

Each HDD group 221 comprises two or more HDDs. These two or more HDDs may be the same type HDD, or may be different types of HDDs. In the example, for example, a HDD (SAS) and a HDD (SATA) are installed. The HDD (SAS) is an HDD comprising a SAS (Serial Attached SCSI) interface. The HDD (SATA) is an HDD comprising a SATA (Serial ATA) interface. The RG may be comprised of multiple of the same type HDD.

The storage controller 300 comprises multiple (for example, redundant) RAID controllers 301.

The multiple PDUs 211, for example, are redundant PDUs. The PDU 211 supplies power from a commercial power source to each FMU 400, each HDD group 221, and each RAID controller 301. Thus, one PDU 211 constitutes a common power source for one or more FMUs 400 and one or more HDDs.

The power capable of being supplied by a single PDU 211 is limited. Specifically, the power, which a single PDU 211 is able to supply, is less than the power needed to operate all the FMPKs 10 at full capacity in an enclosure 270, which is full of FMPKs 10.

For this reason, the number of FMPKs 10 may be less than the maximum number of FMPKs 10 capable of being mounted in an enclosure 270. However, reducing the number of FMPKs 10 also reduces the storage capacity of the storage system 1.

Consequently, in the example, a number of FMPKs 10, for which power in excess of the power capable of being supplied by a PDU 211 is consumed when all of the installed FMPKs 10 are operating at full capacity, is installed. This number, preferably, is the maximum number of installable FMPKs 10. Then, the FMPK 10 power consumption is controlled in individual FMPKs 10. Power consumption control, for example, involves the FM controller 20 adjusting a chip parallel operation rate (the ratio of the number of operating FM chips 32 with respect to the total number of FM chips 32) so as to be equal to or less than the operation rate upper limit configured in the FMPK 10.

The RAID controller 301 can change the operation rate upper limit for individual FMPKs 10. For example, the RAID controller 301 may raise the operation rate upper limit of the FMPK 10 in a case where either the power consumption of the storage system 1 has decreased, or an event, which could decrease this power consumption, has been detected (for example, a case in which the number of FMPKs 10 has been reduced, the number of HDDs has been reduced, or the power consumption of at least one HDD has decreased (for example, the HDD has transitioned to the power saving state, or has had the power turned OFF). Also, for example, the RAID controller 301 may lower the operation rate upper limit of the FMPK 10 in a case where either the power consumption of the storage system 1 has increased, or an event, which could increase this power consumption, has been detected (for example, a case in which the number of FMPKs 10 has been increased, the number of HDDs has been increased, or the power consumption of at least one HDD has risen (for example, the power saving state of the HDD has been cancelled, or the power of the HDD turned ON). The changing of the operation rate upper limit will be explained in detail further below.

Figure 3:
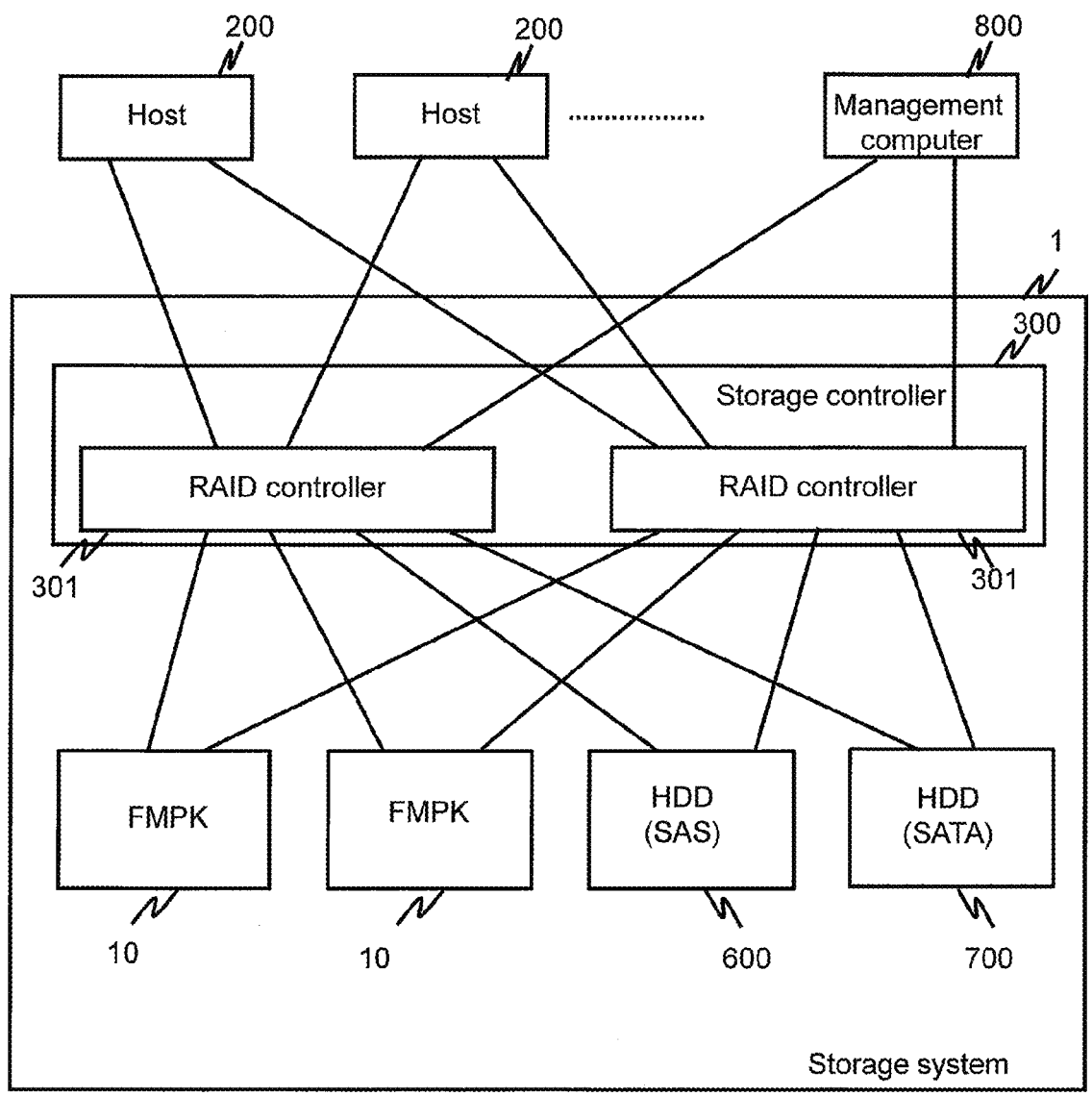
FIG. 3 shows an example of the configuration of a computer system related to the example.

FIG. 3 shows an example of the configuration of a computer system related to the example.

The computer system comprises a storage system 1, a host 200, and a management computer 800. One or more hosts 200 are coupled to the storage system 1 via a communication network (for example, a SAN (Storage Area Network)), and, in addition, the management computer 800 is coupled to the storage system 1 via a communication network (for example, a LAN (Local Area Network)). The storage system 1 stores data used by the host 200. The host 200, for example, is a computer, executes various types of processing, reads data from the storage system 1, and writes data to the storage system 1. The management computer 800 configures the operation rate upper limit of each FMPK 10 in the FMU 400.

The storage system 1 comprises multiple storage devices, and a storage controller 300, which is coupled to these multiple storage devices.

The multiple storage devices, as explained hereinabove, comprise multiple types of storage devices, that is, there are a FMPK 10, a HDD (SAS) 600 and a HDD (SATA) 700.

The storage controller 300 comprises multiple RAID controllers 301. Each RAID controller 301 is coupled to the FMPK 10, the HDD (SAS) 600 and the HDD (SATA) 700 via an internal bus.

The RAID controller 301 is an example of a higher-level apparatus relative to the FMPK 10, the HDD (SAS) 600 and the HDD (SATA) 700. The RAID controller 301 receives a first I/O command from a higher-level apparatus (for example, the host 200) relative to the RAID controller 301, creates a second I/O command in accordance with this first I/O command, and sends the second I/O command to the FMPK 10, the HDD (SAS) 600, or the HDD (SATA) 700. An I/O destination address, which comprises I/O destination information specified in the first I/O command, is a first type address (for example, the address of an area in a LU (Logical Unit) provided by the storage system 1), and an I/O destination address, which comprises I/O destination information specified in the second I/O command, is a second type address (for example, an address of an area in a logical space provided by the FMPK 10) identified on the basis of the first type address. The RAID controller 301 may manage the respective storage areas of the FMPK 10, the HDD (SAS) 600, and the HDD (SATA) 700 as respectively different storage tiers, and may perform processing for allocating a storage area of any of the storage tiers to the logical area of the data write-destination. In addition, the RAID controller 301 may store data with a relatively low frequency of I/Os in either the HDD (SAS) 600 or the HDD (SATA) 700, and may store data with a relatively high frequency of I/Os in the FMPK 10.

The FMPK 10, for example, may comprise a MLC (Multi Level Cell)-type FM, and a FMD (hereinafter, referred to as "SSD in this paragraph for the sake of convenience), which comprises a SLC (Single Level Cell)-type FM, may be provided in the storage system 1 besides the FMPK 10. It is supposed here that the characteristic features are such that an SSD is able to write to the FM more often than the FMPK 10, and alternatively, the FMPK 10 is superior to the SSD from the aspects of reading speed and costs. Thus, the RAID controller 301 may store data for which a read will be performed relatively frequently in the FMPK 10, and may store data for which a write will be performed relatively frequently in the SSD.

Figure 4:
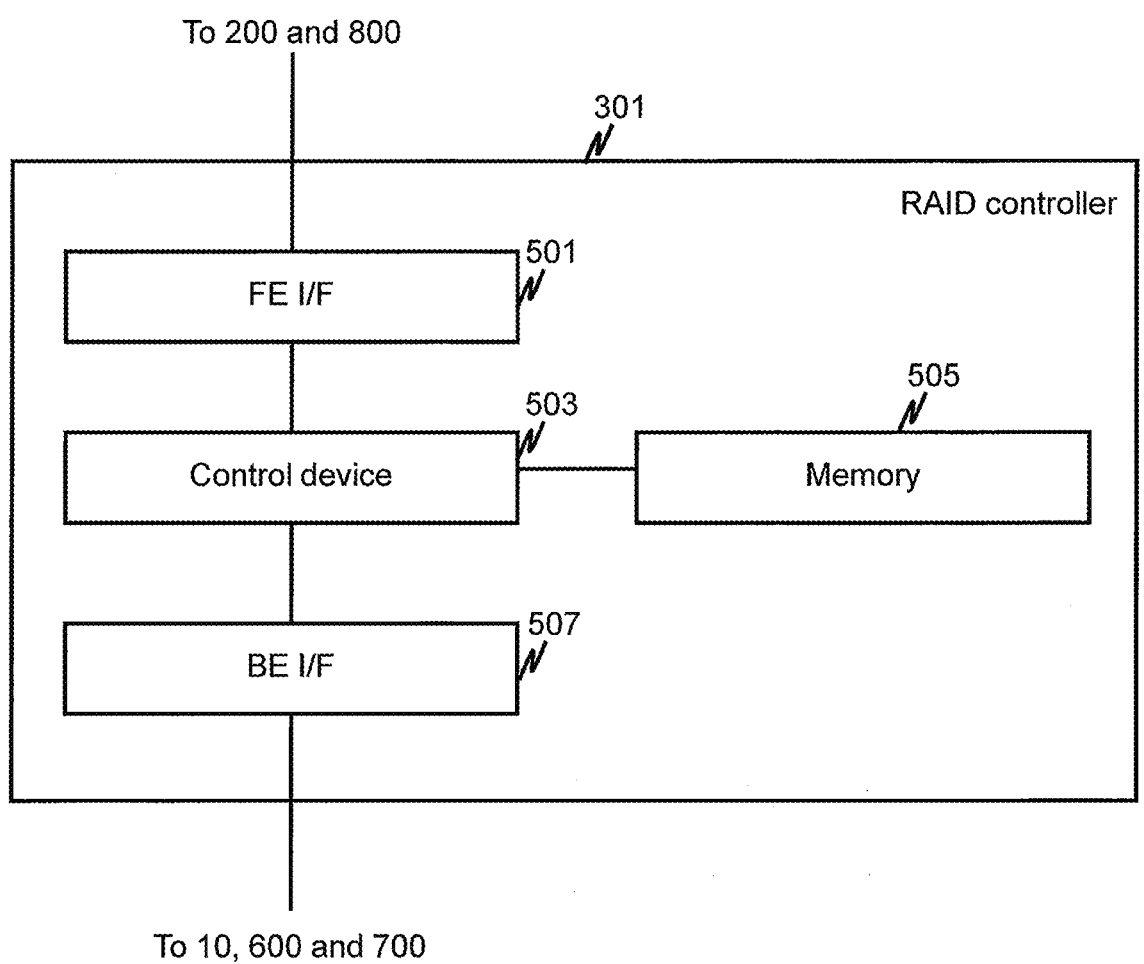
FIG. 4 shows an example of the configurations of a RAID controller related to the example.

FIG. 4 shows an example of the configuration of the RAID controller 301.

The RAID controller 301 comprises a front-end I/F (FE I/F) 501, a backend I/F (BE I/F) 507, a memory 505, and a control device 503, which is coupled thereto. The FE I/F 501 may comprise an I/F for communicating with the host 200, and an I/F for communicating with the management computer 800. The BE I/F 507 may comprise an I/F for communicating with the FMPK 10, an I/F for communicating with the HDD (SAS) 600, and an I/F for communicating with the HDD (SATA) 700. At least two or more of these I/Fs may be shared I/Fs. The memory 505 stores information and a computer program. The control device 503 comprises a processor for executing the computer program stored in the memory 505.

Figure 5:
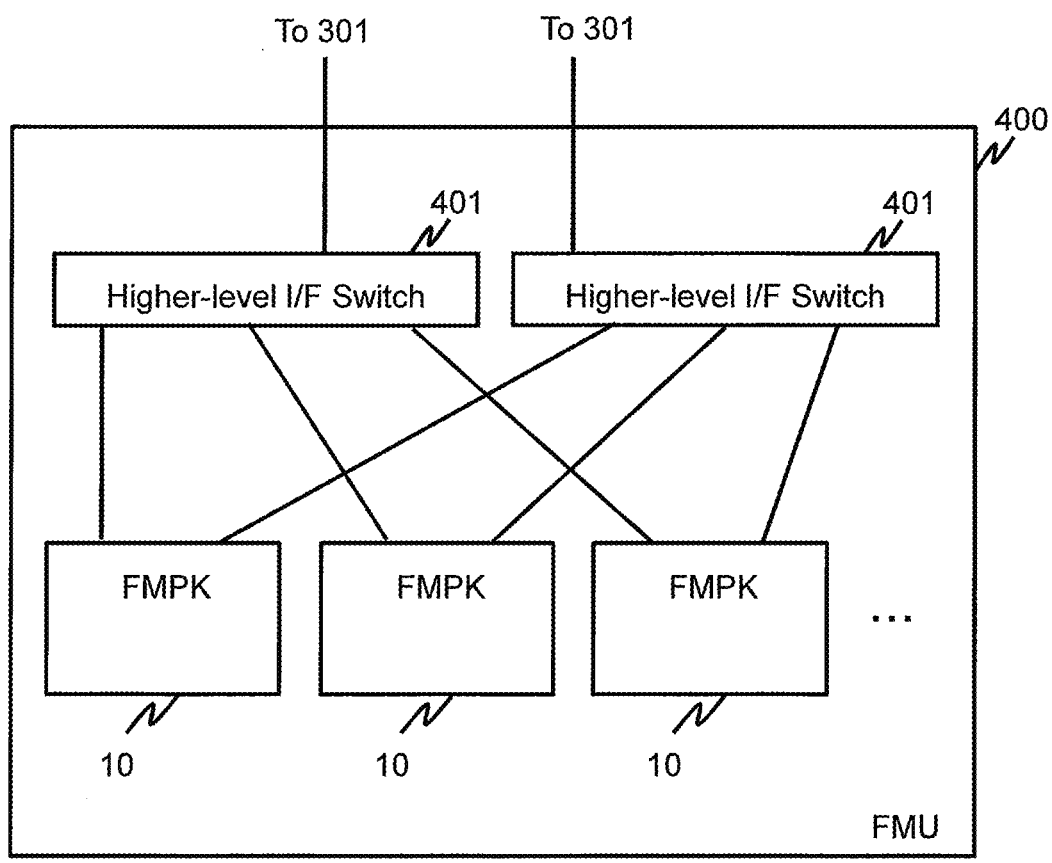
FIG. 5 shows an example of the configuration of a flash memory device (FMD) related to the example.

FIG. 5 shows an example of the configuration of the FMU 400.

The FMU 400 comprises one or more higher-level I/F switches 401, and one or more FMPKs 10. The higher-level I/F switch 401 relays data between the RAID controller 301 and multiple FMPKs 10.

Figure 6:
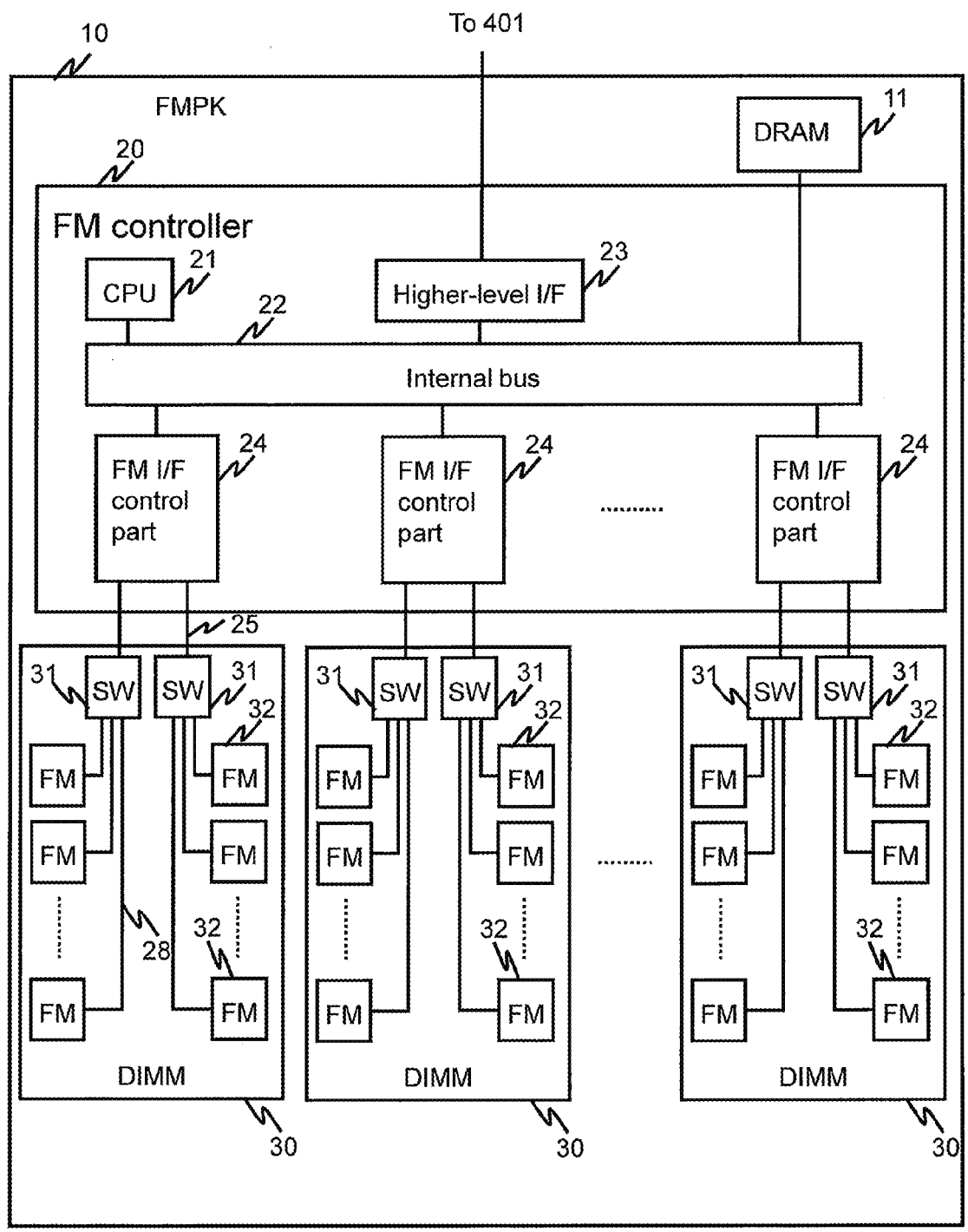
FIG. 6 shows an example of the configuration of a flash memory package (FMPK) related to the example.

FIG. 6 shows an example of the configuration of the FMPK 10.

The FMPK 10 comprises a DRAM (Dynamic Random Access Memory) 11 as an example of a main storage memory, and also comprises an FM controller 20 and multiple (or one) DIMMs (Dual Inline Memory Module) 30. The DRAM 11 stores data and so forth used by the FM controller 20. The DRAM 11 may be mounted in the FM controller 20, or may be mounted in a different component than the FM controller 20. The FMPK 10 may comprise another type of memory (for example, SRAM (Static Random Access Memory)) either instead of or in addition to the DRAM 11.

The FM controller 20, for example, is configured as a single ASIC (Application Specific Integrated Circuit), and comprises a CPU 21, an internal bus 22, a higher-level I/F 23, and multiple (or one) FM I/F control parts 24. The internal bus 22 is communicably coupled to the CPU 21, the higher-level I/F 23, the DRAM 11, and the FM I/F control part 24.

The higher-level I/F 23 is coupled to a higher-level I/F switch 401, and relays communications to the higher-level apparatus. The higher-level I/F 23, for example, is a SAS I/F. The FM I/F control part 24 relays data exchanges among the multiple FM chips 32. In the example, the FM I/F control part 24 comprises multiple sets of buses (data buses and the like) for executing exchanges with the FM chips 32, and uses multiple buses to relay data exchanges with multiple FM chips 32. In the example, the FM I/F control part 24 is provided for each DIMM 30, and the FM I/F control part 24 relays communications to the multiple FM chips 32 of the DIMM 30 coupled to this control part 24. The FM I/F control part 24 may be in charge of two or more DIMMs 30. The CPU 21 can execute various types of processing in accordance with executing a program stored in the DRAM 11 (or another storage area not shown in the drawing). There may be multiple CPUs 21, and the multiple CPUs 21 may divide up the various types of processing among themselves.

The DIMM 30 comprises one or more SWs (switches) 31, and multiple FM chips 32. The FM chip 32, for example, is a MLC-type NAND flash memory chip. The MLC-type FM chip is inferior to the SLC-type FM chip as to the number of writes that are possible, but is characterized in that it features a large per-cell storage capacity.

The SW 31 is coupled to the FM I/F control part 24 via a bus 25 comprising a data bus. In the example, the SW 31 is provided so as to support one set of buses 25, which is coupled to the FM I/F control part 24, and which comprises a data bus. In addition, the SW 31 is coupled to multiple FM chips 32 via a bus 28 comprising a data bus. The SW 31 can be coupled so as to selectively switch between the bus 25 from the FM I/F control part 24 and the bus 28 of any FM chip 32. Since a SW 31 and multiple FM chips 32 are disposed and connected by interconnects in the DIMM 30, a connector for the coupling thereof need not be provided, making it possible to expect that the number of connectors required will be reduced.

According to FIG. 6, the FM chip 32 is coupled to the SW 31 without going through another FM chip 32, but an FM chip 32 may be coupled to the SW 31 by way of another FM chip 32. That is, two or more FM chips 32 connected in series may be coupled to a SW 31.

Figure 35:
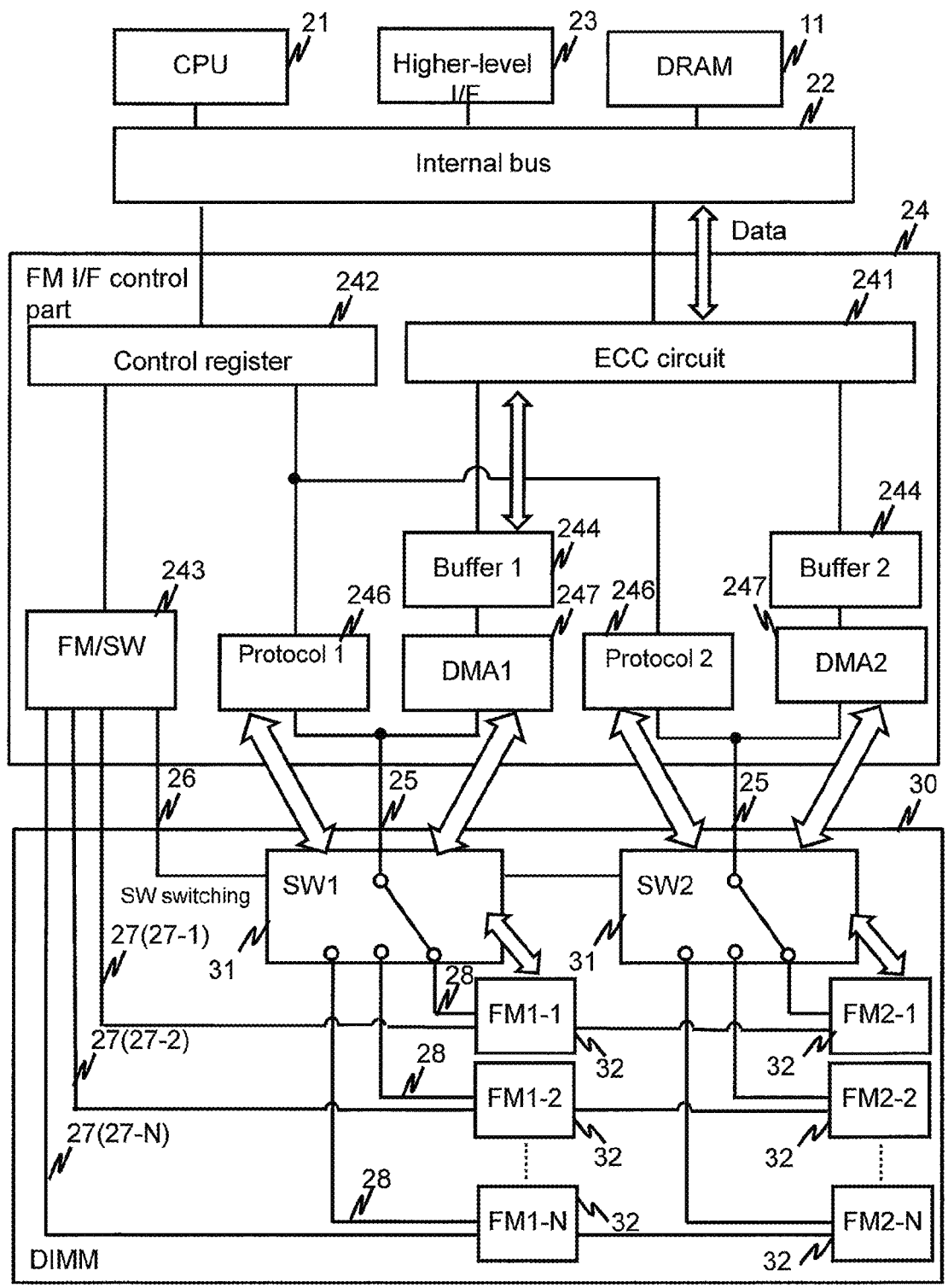
FIG. 35 shows an example of the detailed configuration of a portion of the FMPK related to the example.

FIG. 35 shows an example of the detailed configuration of a portion of the FMPK 10.

The FM I/F control part 24 comprises an ECC (Error Correcting Code) circuit 241, a control register 242, a FM/SW control part 243, a buffer 244, FM bus protocol control parts (noted in the drawing as "protocol 1, protocol 2") 246, and a DMA (Direct Memory Access) part 247. In the example, a group of buffers 244, the FM bus protocol control parts 246, and the DMA 247 is provided to a number of data buses (for example, a set of two) handled by a FM I/F control part 24.

In the DRAM 11, as will be explained further below, write-target data is divided into multiple data elements. The ECC circuit 241 reads a write-target data element from the DRAM 11, executes an error correcting process for creating an error correcting code corresponding (for example, appended) to the write-target data element, and writes the write-target data element and the error correcting code corresponding to this data element to the buffer 244.

In addition, the ECC circuit 241 reads data comprising a read-target data element and an error correction code corresponding to this data element from the buffer 244, and uses the error correcting code corresponding to this data element to determine whether or not an error has occurred in the read-target data element. In a case where the result of this determination is affirmative, the ECC circuit 241 executes an error correcting process for correcting the error in the read-target data element. The ECC circuit 241 stores the read-target data in the DRAM 11.

In the example, the ECC circuit 241 is in charge of error correcting code creation processes and error correction processes for multiple FM chips 32 coupled to multiple data buses. The code creating circuit part for executing the error correcting code creation process and the error correcting circuit part for executing the error correction process may be either a single circuit or multiple circuits. Curbing the number of code creating circuit parts and/or error correcting circuit parts makes it possible to hold down the size of the FM I/F control part 24. Furthermore, since the circuit size of the code creating circuit part is relatively small, multiple code creating circuit parts may exist. In either case, since at the least the error correcting circuit part is shared by multiple data buses, a reduction in the size of the circuit can be expected.

The control register 242 stores information required for controlling access to the FM chip 32. The information required for controlling access, for example, is configured by the FM bus protocol control part 246 under the control of the CPU 21.

The FM/SW control part 243, in accordance with the control register 242 setting, outputs a signal (switching signal) for switching multiple SWs 31 of the DIMM 30, and a chip enable signal (CE signal) for selecting an access-target FM chip 32. In this example, the multiple CE signal lines 27 (27-1, 27-2, 27-N) and a signal line 26 (switching signal line) for switching signal use shared by these multiple CE signals lines 27 are coupled to the FM/SW control part 243. Each CE signal line 27 is coupled to a different FM chip 32 subordinate to a different SW 31.

The switching signal line 26 coupled to the FM/SW control part 243 is coupled to multiple SWs 31 (SW1, SW2) of the DIMM 30. In accordance with this, the same switching signal is supplied to the multiple SWs 31. For example, it is supposed that FM chips 32, which are coupled to the same CE signal line 27, are coupled to the same number pin with respect to all of the multiple SWs 31 in the same DIMM 30.

In this case, when these multiple SWs 31 receive the same switching signal, the FM chips 32 coupled to the same CE signal line 27 can be treated as the coupling destination of the respected SWs 31. Therefore, it is possible to make multiple FM chips 32 coupled to the same CE signal line 27 the write destinations of multiple data elements, thereby making it possible to expect that these multiple data elements are written in parallel.

The CE signal line 27 coupled to the FM/SW control part 243 is coupled to multiple FM chips 32 handled by multiple SWs 31. In the example, the CE signal line 27-1 is coupled to FM #1-1 and FM #2-1, the CE signal line 27-2 is coupled to FM #1-2 and FM #2-2, and similarly, the CE signal line 27-N is coupled to FM #1-N and FM #2-N. According to this configuration, a CE signal is supplied substantially simultaneously to multiple FM chips 32 coupled to the same CE signal line 27. For this reason, these FM chips 32 are able to operate in parallel at substantially the same time. In the example, when the switching signal is supplied, the bus, which comprises the data bus of the FM chips 32 respectively coupled to the same CE signal line 27, is switched in SW #1 and #2 so as to couple to the FM I/F control part 24.

The buffer 244 temporarily stores a data element targeted to be written to an FM chip 32 and the error correcting code thereof. The buffer 244 also temporarily stores a data element targeted to be read from an FM chip 32 and the error correcting code thereof.

The DMA 247 reads a write-target data element and the error correcting code thereof stored in the buffer 244, and writes these to the FM chip 32. The DMA 247 also reads a read-target data element and the error correcting code thereof from the FM chip 32 and writes these to the buffer 244.

The FM bus protocol control part 246 issues (outputs) a command (a read command or a program command) to the FM chip 32 in accordance with the control register 242 setting. The FM bus protocol control part 246 also checks the operation result (status) of the FM chip 32 with respect to the command, and configures the operation result in the control register 242.

A data bus is coupled to the DMA 247, a signal line for command use is coupled to the FM bus protocol control part 246, and the bus 25, which comprises the data bus and the command signal line, is coupled to the SW 31.

The switching signal line 26 is coupled to the SW 31, and, the bus 25, which comprise a data bus, is also coupled to the SW 31. In this example, the same switching signal line 26 is coupled to SWs #1 and #2. In addition, a bus 28, which comprises a data bus connected to multiple FM chips 32, is coupled to the SW 31. The SW 31, based on a switching signal supplied by the switching signal line 26, selectively couples any one of multiple buses 28 to the bus 25. In accordance with this SW 31, access to multiple FM chips 32 can be executed using a single bus 25. In addition, since the SW 31 selectively couples any one of multiple buses 28 to the bus 25, the load capacity of the bus when a signal is sent can be held in check, making it possible to maintain high signal quality. In the example, when a switching signal is supplied, switching is performed in the SWs #1 and #2 so that a bus 28, which comprises a data bus of FM chips 32 respectively coupled to the same CE signal line 27, is coupled to the bus 25 connected to the FM I/F control part 24.

According to FIGS. 3 through 6 and FIG. 35 above, for example, the following statement can be made as an overview.

That is, the FM I/F control part 24, which is an example of a medium interface of the FMPK 10, outputs to an FM chip 32 a chip enable signal (CE signal), data to be written to this FM chip 32, and an address to be used as the write target of this data. In the example, as shown in FIG. 35, the signal line 27 for a CE signal outputted from the FM I/F control part 24 is arranged so as to be coupled to multiple FM chips 32. Since there may be one output terminal (pin) for one CE signal line 27 in the FM I/F control part 24, there may be a smaller number of pins than the number of FM chips 32. For this reason, it is possible to reduce the area needed for the pin layout in the ASIC or other such circuit comprising the FM I/F control part 24.

In the example, as shown in FIG. 35, the bus (bus: called a bus even though it does not comprise a control line) 25 over which flows the data, address, and other such signals (signals other than the CE signal) outputted from the FM I/F control part 24 is coupled to each switch 31. In addition, M (where M is an integer of 2 or more, for example, M=4) FM chips 32 are coupled to the switch 31 via the bus 28. The switch 31 is able to switch the coupling of the bus 25 to any of the buses 28. Since data, an address and the like are exchanged via the bus 25, in a read and write from/to multiple FM chips 32, a pin to which the bus 25 is coupled may be secured in the FM I/F control part 24. Therefore, it is possible to reduce the area needed for the pin layout in an ASIC or other such circuit comprising the FM I/F control part 24. In addition, since the bus 25 is switched to any of multiple buses 28 by the switch 31, a state in which multiple buses 28 are electrically coupled is avoided. For this reason, the load capacity of all the interconnects coupled to the FM chip 32 via the bus 25 can be held in check, and the quality of data exchanges between FM chips 32 can be made relatively high.

A write process related to the example will be explained next.

Figure 7:
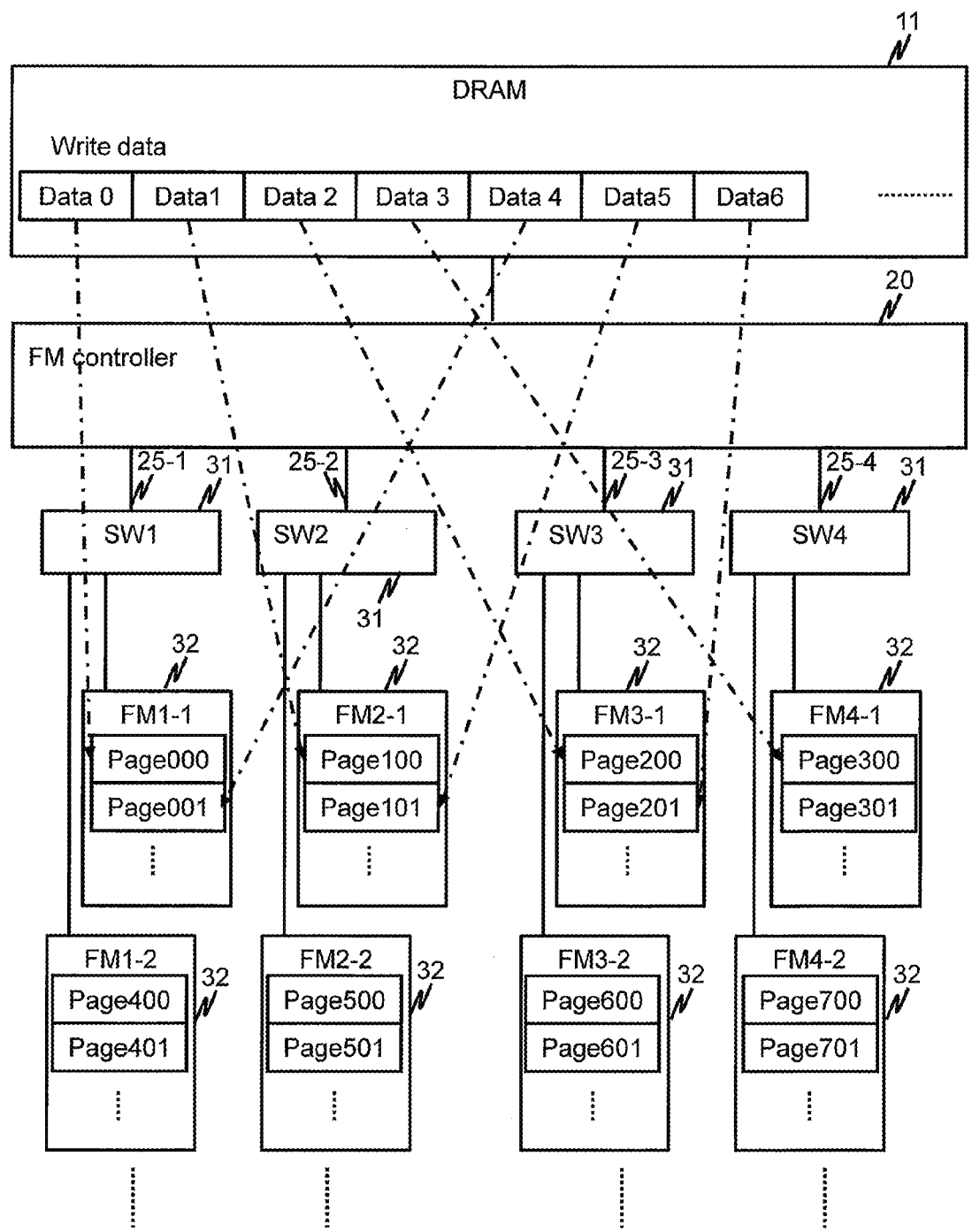
FIG. 7 is a diagram illustrating an example of a write process related to the example.

FIG. 7 is a diagram illustrating an example of a write process related to the example.

The FM controller 20 stores write-target data (write data) in the DRAM 11, divides the write data into multiple data elements (#0 through #6), and transfers these multiple data elements to multiple FM chips 32. As used here, "write data" is typically either all or a part of the data, which the RAID controller 301 receives from the host 200. The size of a data element is based on the page size of the FM chip 32 and the size of the ECC. In a case where a data element is compressed and stored in a page, the size of the data element may be equal to or larger than the size of the page. A data element and a ECC are stored in a page.

A specific example of a write process will be explained in detail below.

First, the FM controller 20 (for example, the CPU 21) switches the SW #1, couples a bus 25-1 to a FM chip #1-1, and transfers a data element #0 to the FM chip #1-1 via the bus 25-1. The data element #0 is written to a page #000 of the FM chip #1-1. The FM controller 20 (for example, the CPU 21) also switches the SW #2, couples a bus 25-2 to a FM chip #2-1, and transfers a data element #1 to the FM chip #2-1 via the bus 25-2. The data element #1 is written to a page #100 of the FM chip #2-1. The FM controller 20 may send a CE signal via the CE signal line 27-1, which is coupled to the FM chips #1-1 and #2-1. In accordance with this, the data elements #0 and #1 can be written to the FM chips #1-1 and #2-1 in parallel.

Similarly, the FM controller 20 switches a SW #3 and transfers a data element #2 to a FM chip #3-1, and switches a SW #4 and transfers a data element #3 to a FM chip #4-1. The FM controller 20 may send a CE signal via the CE signal line 27, which is coupled to the FM chips #3-1 and #4-1. In accordance with this, the data elements #2 and #3 can be written to the FM chips #3-1 and #4-1 in parallel.

Next, the FM controller 20 transfers the data element #4 to the FM chip #1-1 via the bus 25-1. The data element #4 is written to a page #001 of the FM chip #1-1. Similarly, the FM controller 20 transfers a data element #5 to the FM chip #2-1, and transfers a data element #6 to the FM chip #3-1.

When the FM controller 20 transfers the data element #0 to the FM chip #1-1 here, the bus 25-1 transitions to a busy state, and data cannot be transferred via the bus 25-1 during the busy state. In addition, the data #0 transferred to the FM chip #1-1 is written to the page #000 after being stored in a buffer (not shown in the drawing) of the FM chip #1-1. The FM chip #1-1 transitions to the busy state until the writing of the data element #0 stored in the buffer has been completed. Generally speaking, in the case of a write process, the time period of the busy state of the FM chip 32 is longer than the time period of the busy state of the bus 25. For this reason, when the FM controller 20 transfers the data element #4 to the FM chip #1-1, there may be cases in which the FM chip #1-1 is in the busy state, and in this case, the FM controller 20 transfers the data element #4 after the busy state of the FM chip #1-1 has been cancelled.

In the above-described flow of processing, the data element (for example, #0) on the DRAM 11 is stored in the buffer 244 (for example, #1) coupled to the SW 31 (for example, #1), which is coupled to the transfer-destination FM chip 32 (for example, #1-1) of this data element. The protocol control part 246 (for example, #1), in accordance with an instruction from the CPU 21, boots up the DMA 247 (for example, #1). The booted DMA 247 transfers the data element (for example, #0) inside the buffer 244 (for example, #1) to the storage-destination FM chip 32 (for example, #1-1) of this data element. In a case where the data element (for example, #0) is written to the FM chip 32 (for example, #1-1), a complete status is sent from this FM chip 32 (for example, #1-1) to the protocol control part 246 (for example, #1). The protocol control part 246 (for example, #1) may write information denoting the fact that this complete status has been received to the control register 242. The CPU 21, in accordance with referencing the control register 242, can learn that the data element (for example, #0) has been written to the FM chip 32 (for example, #1-1).

As described hereinabove, the FM controller 20 divides the write data into multiple data elements, and transfers a sequence of two or more data elements in order to different FM chips 32. Thus, by making good use of the busy states of the bus 25 and the FM chip 32, data can be transferred to another bus and another FM chip 32, thereby making it possible to transfer data efficiently.

In a case where yet other write data is stored in the DRAM 11, the FM controller 20 begins storing this other write data in the FM chip 32 (for example, #2-1) subsequent to the FM chip 32 (for example, #1-1) comprising the page in which the data element at the end of the immediately previous write data is stored. The other write data is also divided into multiple data elements, and these multiple data elements are written in parallel. Then, in a case where the data elements have been written down to the end page of the FM chips #1-1, #2-1, #3-1, and #4-1 (that is, the first FM chip group), the FM controller 20 switches the coupling destinations of the respective SWs 31 to a FM chip (for example, FM chips #1-2, #2-2, #3-2 and #4-2 belonging to the second FM chip group), which belongs to the next FM chip group after the FM chip 32 belonging to the first FM chip group, and transfers a data element to this FM chip 32. Thereafter, in a case where an overwrite write (a write having the same logical area as a logical address space provided by the FMPK 10 as the write destination) with respect to stored write data has occurred, the FM controller 20 switches the SW 31 and distributively transfers data to an $n^{th}$ FM chip group, a $(n+1)^{th}$ FM chip group, and so forth (where n is an integer of equal to or larger than 1). In this process, the FM controller 20 may transfer a data element to the $(n+1)^{th}$ FM chip group when the FM chip 32 of the $n^{th}$ FM chip group is in the busy state.

In the example, as was explained hereinabove, the CE signal line 27 is shared by multiple FM chips 32 (more accurately, multiple FM chips 32 coupled to different SWs 31). The FM controller 20, in accordance with switching the SW #1 and coupling the bus 25-1 to the FM chip #1-1, and switching the SW #2 and coupling the bus 25-2 to the FM chip #2-1, is able to transfer two consecutive data elements #0 and #1 in parallel to FM chip #1-1 and FM chip #2-1. In addition, after transferring data element #0 to FM chip #1-1 and data element #1 to FM chip #2-1, the FM controller 20 simultaneously (parallelly) boots the FM chip #1-1 and the FM chip #2-1 by sending a CE signal via the CE signal line 27-1. In accordance with this, the FM chip #1-1 (#2-1) writes the received data element #0 (#1).

That is, the FM controller 20 divides the write data into multiple data elements, selects the SWs in order, regards the SW coupling destinations as FM chips 32 coupled to the same CE signal line, respectively transfers in parallel two or more consecutive data elements to two or more FM chips 32 coupled to the same CE signal line, and sends a CE signal via this same CE signal line. This makes it possible to write the write data with increased efficiency. When the FM controller 20 transfers the multiple data elements, the respective SWs may be controlled so that they each switch independently, or may be controlled so as to switch in synchronization.

Figure 8:
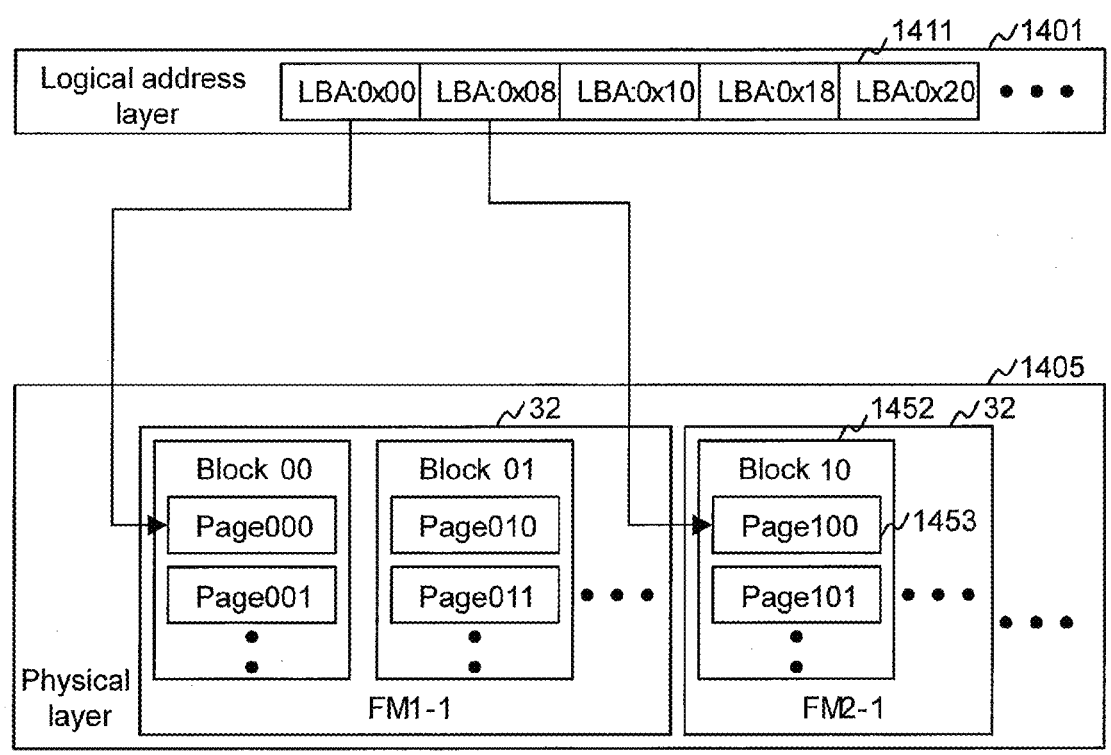
FIG. 8 shows an example of the relationship between a logical address layer and a physical layer related to the example.

FIG. 8 shows an example of the relationship between a logical address layer and a physical layer related to the example.

The logical address layer 1401 as a logical address space, which the FMPK 10 provides to the higher-level apparatus (for example, either the RAID controller 301 or the host 200). A logical address here, for example, may be a LBA (Logical Block Address). The logical address space 1401 is managed by being partitioned into multiple logical areas 1411.

The physical layer 1405 is a storage space of multiple FM chips 32, and comprises multiple blocks 1452. Each block 1452 comprises multiple pages 1453.

A logical area 1411 is associated with a physical page 1453. Logical-physical translation information, which denotes which page 1453 corresponds to which logical area 1411, for example, is stored in a storage area (for example, DRAM 11) of the FM controller 20. This information may be backed up in one or more FM chips 32.

For example, in FIG. 8, the logical area 1411 from LBA 0x00 to 0x07 is allocated to page #000 of block #00 of FM chip #1-1, and the logical area 1411 from LBA 0x08 to 0x0F is allocated to page #100 of block #10 of FM chip #2-1. Thus, in a case where a read request specifying any of the LBAs from LBA 0x00 to 0x07 has been issued from the RAID controller 301, which is one of the higher-level apparatuses relative to the flash memory device 400, the FM controller 20 receives this read request, and in accordance with this read request, reads a data element from page #000 on the basis of the logical-physical translation information, and returns this read data element to the higher-level apparatus.

Figure 9:
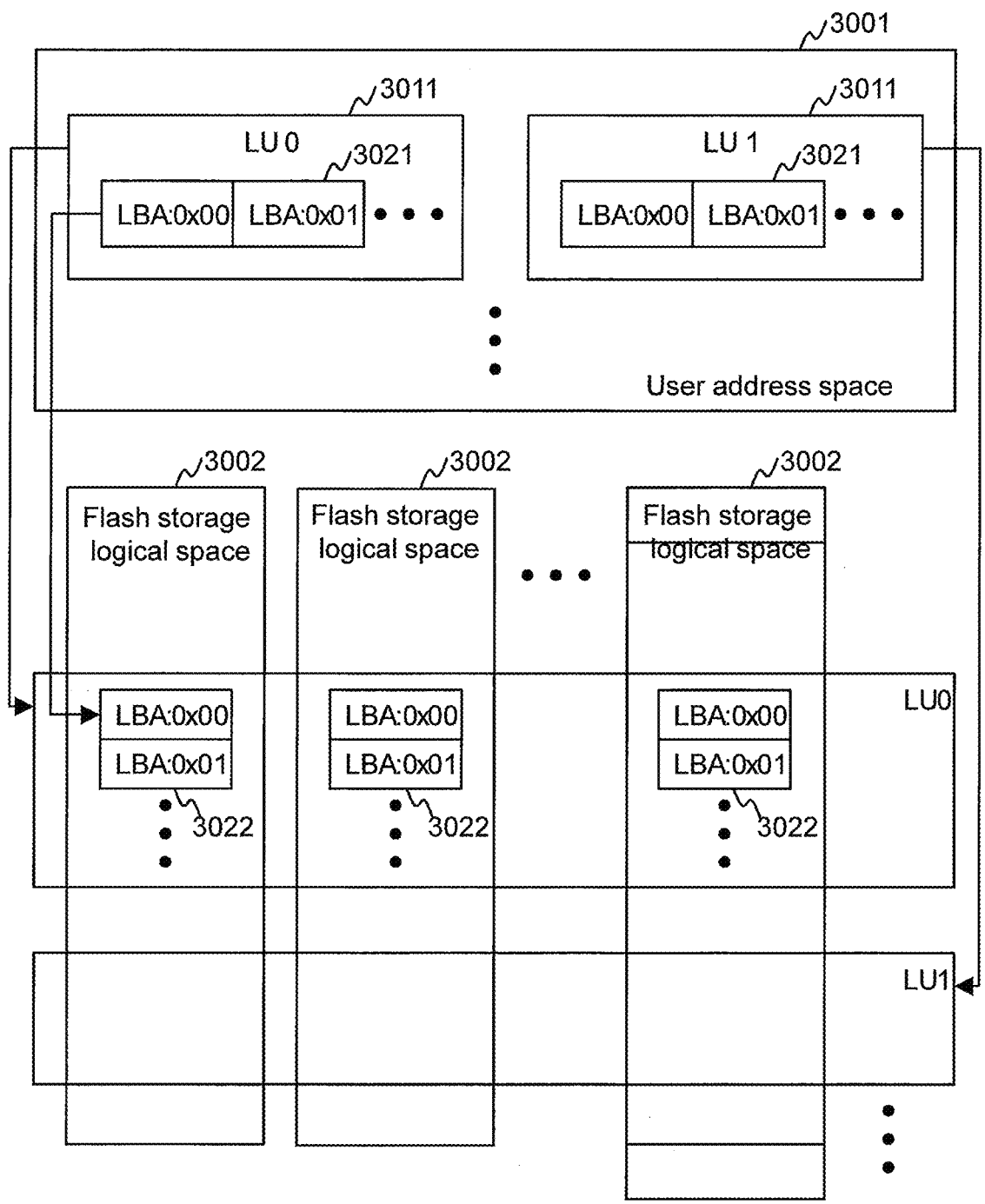
FIG. 9 shows an example of the relationship between a user address space and a logical address space related to the example.

FIG. 9 shows an example of the relationship between a user address space and a logical address space related to the example.

The user address space 3001 is decided in accordance with a LU (Logical Unit) number and the logical address (LBA) thereof. In this drawing, there are multiple LUs 3011, and each LU 3011 comprises multiple logical blocks 3021. A logical block 3021 is allocated to multiple logical blocks 3022 of the same logical address of multiple different flash storage logical spaces 3002. The above-described logical area 1411 (refer to FIG. 8) comprises one or more logical blocks 3022. The flash storage logical space 3002 is typically a logical address space 1401 provided by the FMPK 10.

According to this drawing, user address space 3001-related striping signifies that a single logical block 3021 spans multiple different flash storage logical spaces 3002. Alternatively, striping related to the flash storage logical space 3002 (the logical address space 1401), according to FIG. 8, signifies that two or more logical areas 1411 having consecutive addresses span two or more different FM chips 32, which share a CE signal line 27.

The LU 3011 may be a pool LU comprising segments, which are allocated to a virtual LU area conforming to Thin Provisioning. The pool LU is an LU comprising a capacity pool, and is managed by being partitioned into multiple segments. A segment is allocated to a virtual LU area. In accordance with this, the segment may comprise one or more logical blocks 3021.

Figure 10:
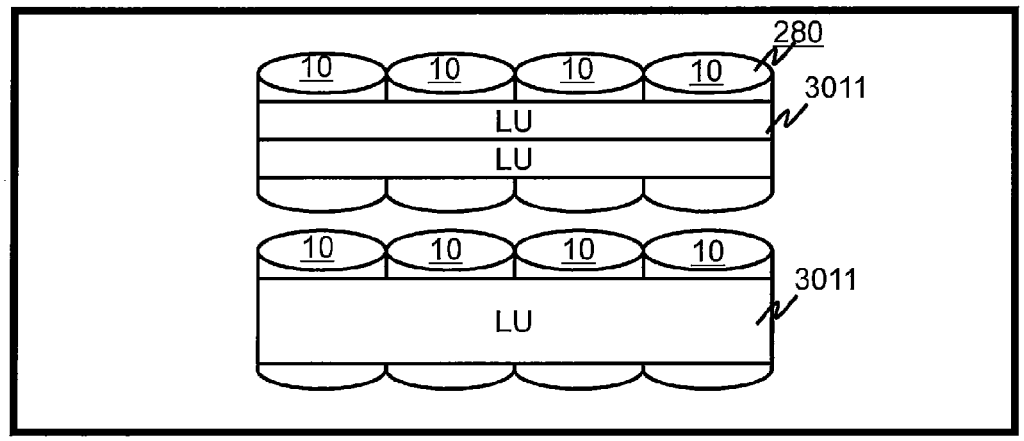
FIG. 10 shows an example of the corresponding relationship between a RAID group and a LU related to the example.

In addition, as shown in FIG. 10, multiple LUs 3011 may be formed based on a single RG 280, or a single LU 3011 may be formed based on a single RG 280.

Figure 11:
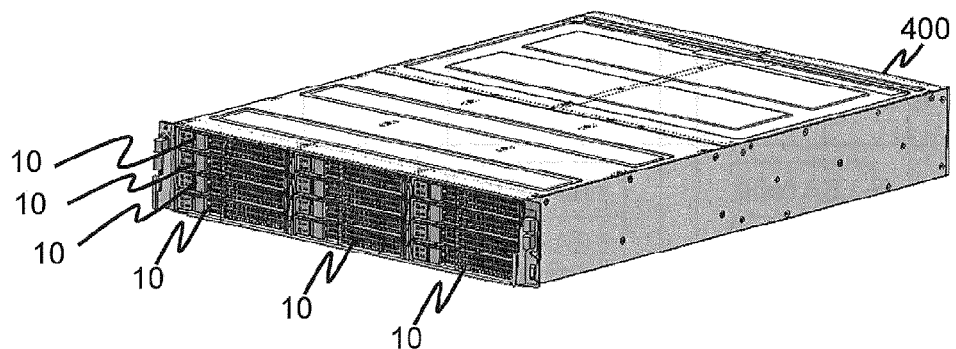
FIG. 11 is an example of a perspective view from the front top side of a FMD related to the example.

FIG. 11 is an example of a perspective view from the front top side of the FMU 400.

The FMU 400 constitutes a shape, which is capable of being mounted in a standard 19-inch-wide rack. The height of the FMU 400, for example, is 2 U. The FMU 400, for example, can hold 12 (3 columns×4 rows) FMPKs 10.

Figure 12:
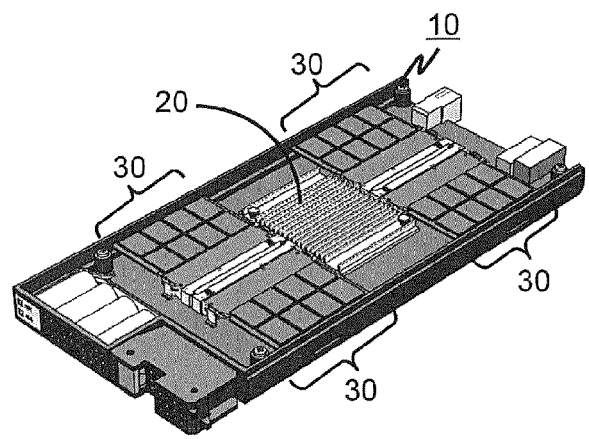
FIG. 12 is an example of a perspective view from the top side of a FMPK related to the example.
Figure 13:
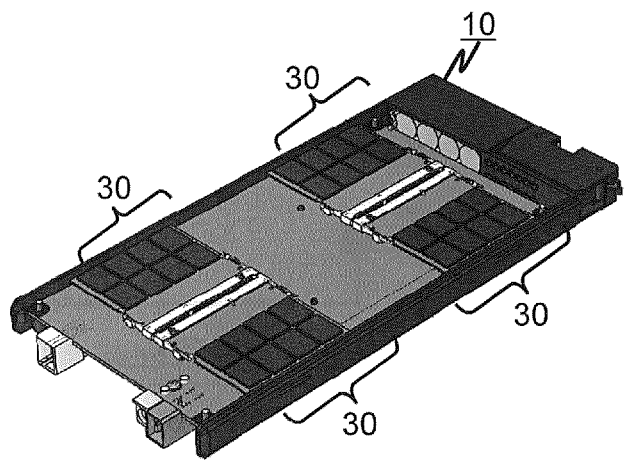
FIG. 13 is an example of a perspective view from the bottom side of a FMPK related to the example.

FIG. 12 is an example of a perspective view from the top side of the FMPK 10, and FIG. 13 is an example of a perspective view from the bottom side of the FMPK 10.

On the top side of the FMPK 10, the FM controller 20, which is a ASIC, is arranged substantially in the center in the planar direction of this FMPK 10, and on the front and back sides thereof DIMMs 30 are respectively arranged two by two. On the bottom side of the FMPK 10, DIMMs 30 are respectively arranged two by two on the front and back sides of the bottom surface area of the FM controller 20. Therefore, eight DIMMs are arranged in the FMPK 10. Since the FM controller 20 is arranged substantially in the center like this, the lengths of the interconnects to the respective DIMM 30 from the FM controller 20 can be made substantially equal.

Figure 14:
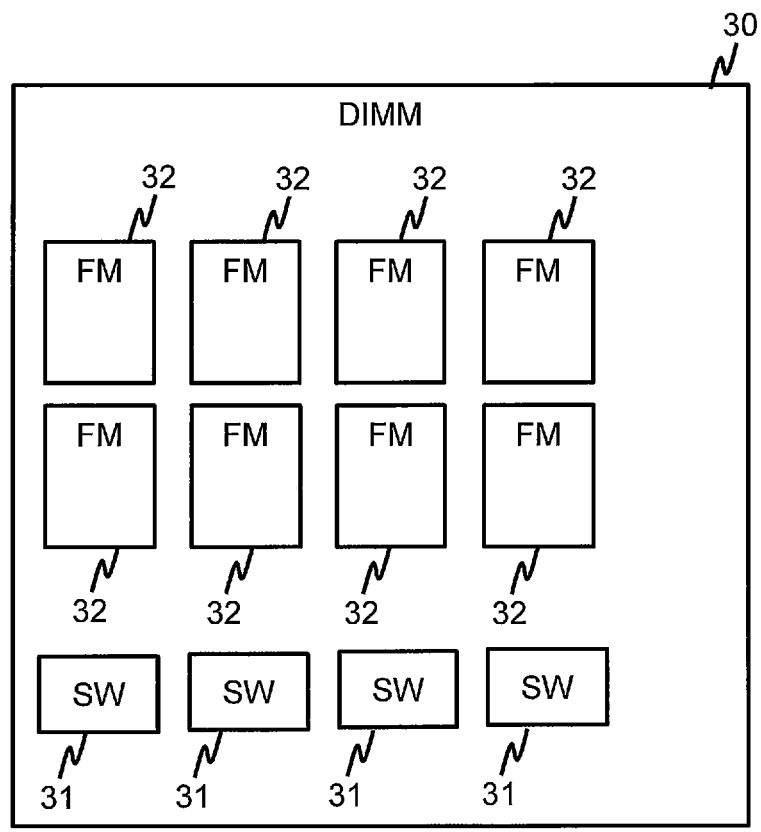
FIG. 14 shows an example of a simplified configuration of a DIMM related to the example.

FIG. 14 shows an example of a simplified configuration of a DIMM 30.

The DIMM 30, for example, comprises eight FM chips 32, and four SWs 31. One SW 31 switches buses for two FM chips 32.

The number of FM chips 32 and the number of SWs 31 in the DIMM 30 are not limited to the numbers shown in FIG. 14.

In addition, the DIMM 30 may comprise an ECC circuit 34. An ECC circuit 34 may be provided for each FM chip 32. In a case where either the DIMM 30 or the FM chip 32 comprises an ECC circuit, the FM I/F control part 24 does not need to comprise the ECC circuit 241.

Figure 15:
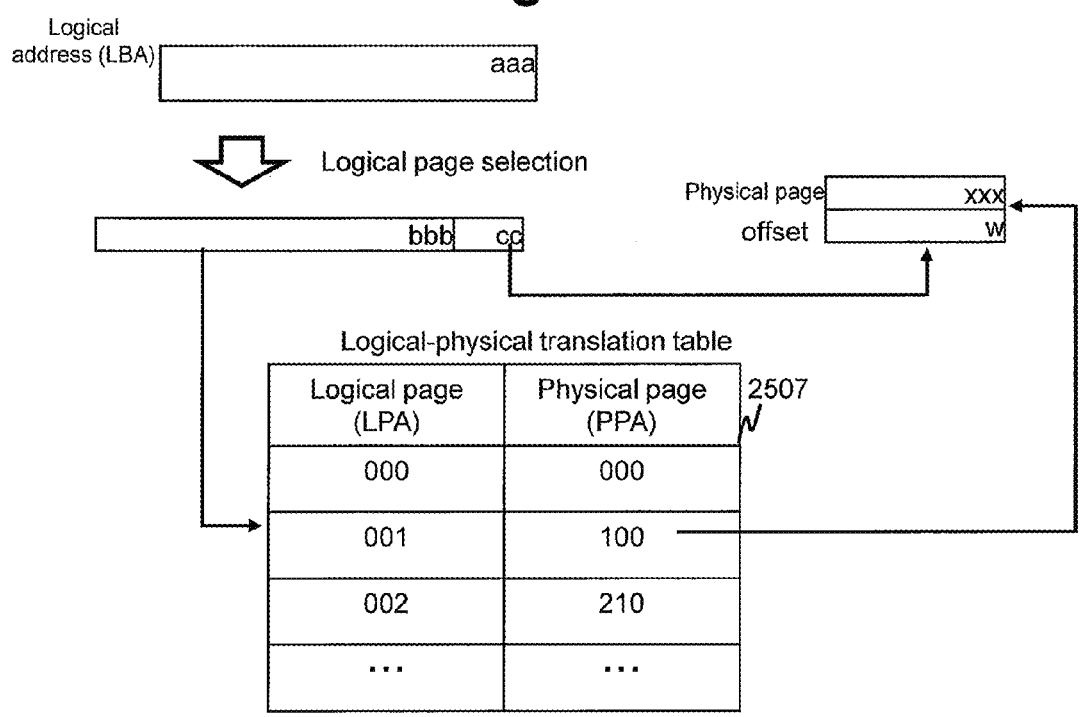
FIG. 15 shows an example of the flow by which an I/O destination physical page is identified using a lower-level command logical address in the example.

FIG. 15 shows an example of the flow of processing via which an I/O-destination physical page is identified using a logical address of a lower-level command. The "physical page" is a page of the FM chip.

The FM controller 20 comprises a logical-physical translation table 2507. The logical-physical translation table 2507 comprises a set of a LPA (logical page address) and a PPA (physical page address) for each logical area (hereinafter, "logical page" for convenience sake). A lower-level command (typically, an I/O command), which is received by the FM controller 20, comprises a logical address (LBA). The FM controller 20 references the logical-physical translation table 2507, identifies a LPA suitable for a higher-level part of the logical address, identifies a PPA corresponding to the identified LPA, and identifies a physical page on the basis of the identified PPA and a lower-level part of the lower-level command.

The method for identifying a physical area using a logical address specified in the lower-level command is not limited to the method shown in FIG. 15.

Figure 16:
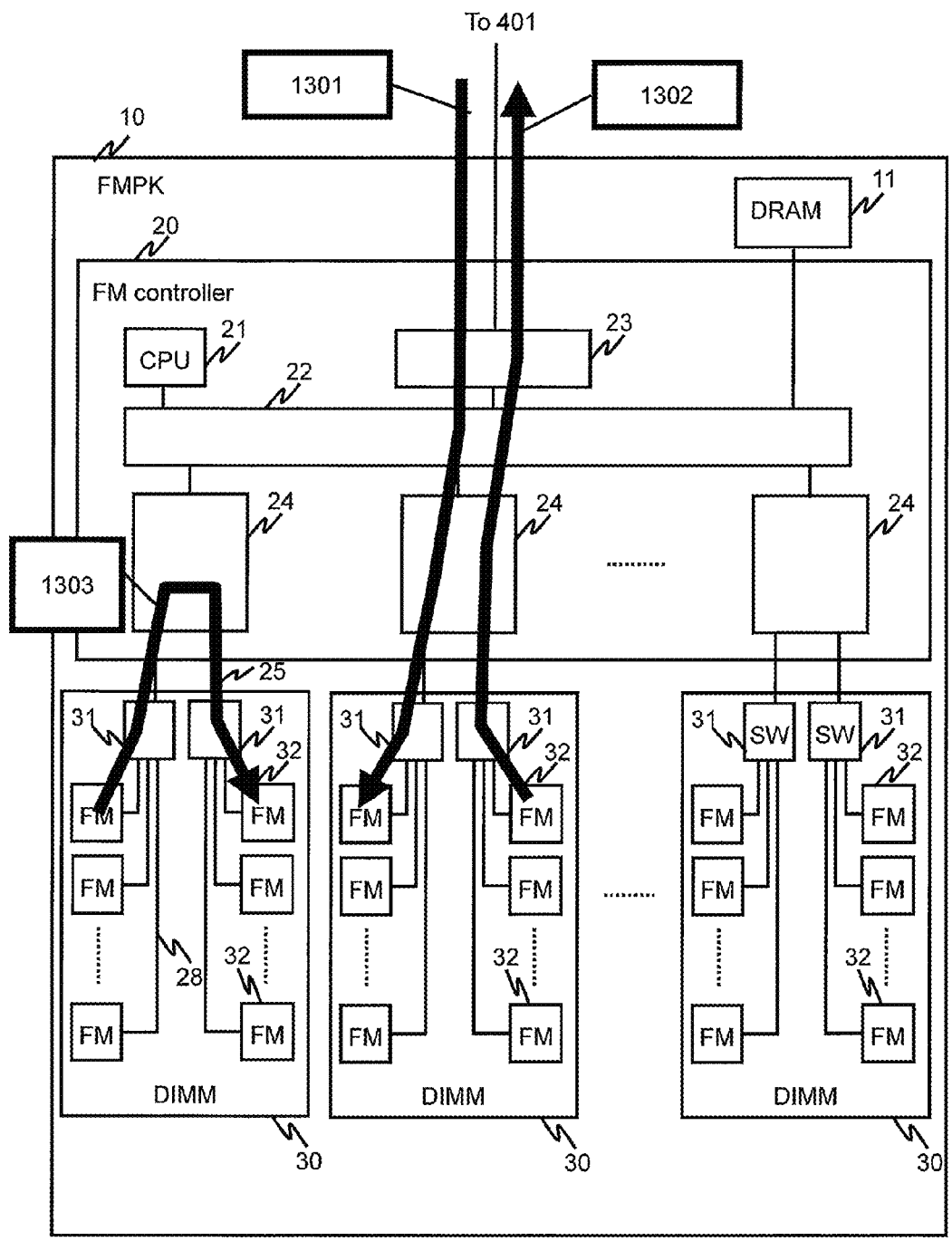
FIG. 16 shows an example of the flow of data in the FMPK related to the example.

FIG. 16 shows an example of the flow of data in the FMPK 10.

An arrow 1301 denotes the flow of write-target data. According to the arrow 1301, the FM controller 20 receives write data and a write command specifying a logical address from the RAID controller 301. The FM controller 20 identifies one or more physical addresses (PPA) based on one or more logical addresses (LPA) specified in this write command, and creates a write command specifying the identified physical address(es) for the identified physical addresses. The FM controller 20 sends the created write command and a write data-based write data element to the FM chip 32, which comprises the physical page conforming to the physical address specified in this write command.

An arrow 1302 denotes the flow of read-target data. According to the arrow 1302, the FM controller 20 receives a read command specifying a logical address from the RAID controller 301. The FM controller 20 identifies one or more physical addresses (PPA) based on one or more logical addresses (LPA) specified in this read command, and creates a read command specifying the identified physical address for the identified physical addresses. The FM controller 20 sends the created read command to the FM chip 32, which comprises the physical page conforming to the physical address specified in this read command.

An arrow 1303 denotes the flow of data, which is migrated in accordance with an internal process. According to the arrow 1303, the FM controller 20 sends a read command specifying the physical address of a migration-source (read-source) physical page in which data targeted for an internal process (for example, either a reclamation process or a refresh process) is stored to the FM chip 32 comprising the migration-source physical page. The FM controller 20 sends a write command, which treats data read in response to this read command as a write target, and specifies the address of the migration-destination (write-destination) physical page of this data to the FM chip 32, which comprises this migration-destination physical page.

Figure 17:
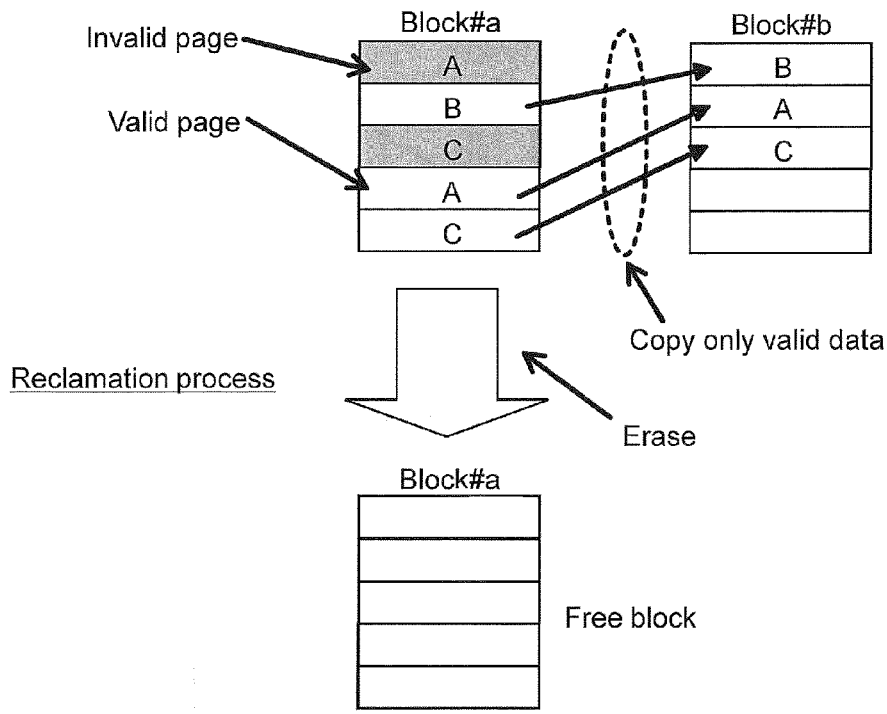
FIG. 17 shows an overview of a reclamation process related to the example.

FIG. 17 shows an overview of a reclamation process related to the example.

As described hereinabove, the FM chip 32 has characteristics such that an overwrite to a page in which data is stored is not possible, a data I/O is performed in page units, and a data erase is performed in block units. For this reason, in the pages inside each FM chip 32, when data written to a certain page is updated, the latest data is written to a free page other than the page in which the old data is written and is managed as "valid data". Alternatively, the page in which the old data is written is managed as an "invalid page". A reclamation process is performed in order to enable this "invalid page" to be used as a free page.

In the reclamation process, the FM controller 20 makes a block #a into a free block by migrating only the valid data in the block #a from the block #a to a free block #b, and, in addition, erasing the data from the block #a.

Figure 18:
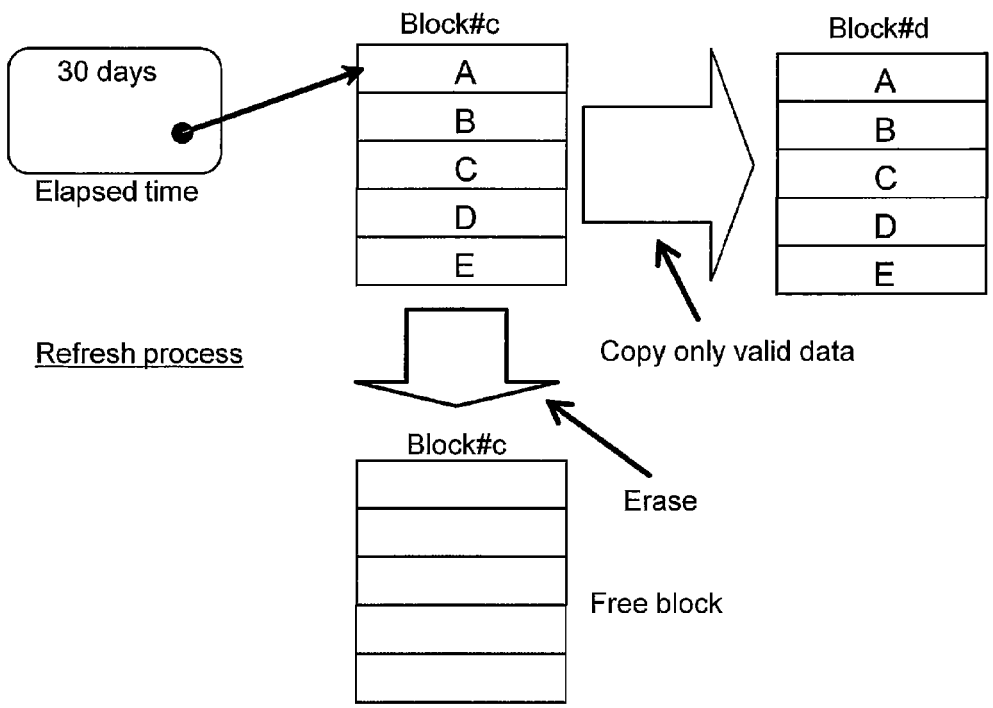
FIG. 18 shows an overview of a refresh process related to the example.

FIG. 18 shows an overview of a refresh process related to the example.

When a long period of time has passed since data was stored in a block of the FM chip 32, the data is likely to deteriorate. A refresh process is therefore performed as a method for preventing the deterioration of the data.

In the refresh process, the FM controller 20 migrates valid data only from a block #c to a free block #d in a case where a fixed period of time has elapsed since data was stored in a prescribed page (for example, the first page) of a free block #c. In accordance with this, valid data is no longer in the block #c. Data may be erased from the block #c either during the refresh process or after the refresh process.

As has been explained hereinabove, in this example, the FM controller 20 in an individual FMPK 10 adjusts the chip parallel operation rate to become equal to or less than the operation rate upper limit by adjusting the number of lower-level commands, which are parallelly processed at the same time. The operation rate upper limit (or, another type of power consumption upper limit) is changeable.

Figure 19:
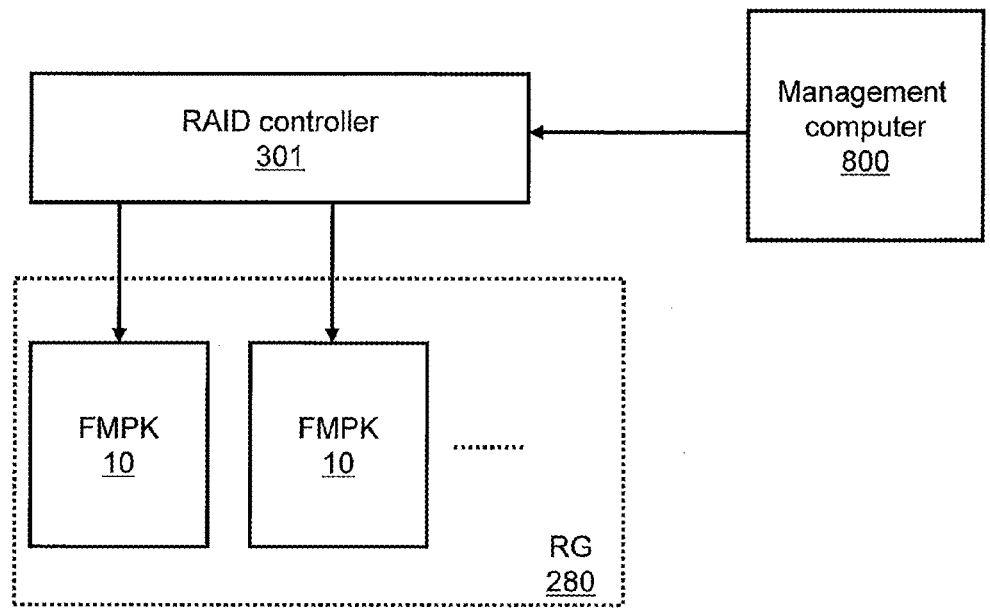
FIG. 19 shows an overview of the flow of a change in an operation rate upper limit related to the example.

FIG. 19 shows an overview of the flow for changing the operation rate upper limit.

The operation rate upper limit can be changed in accordance with the FM controller 20 receiving an upper-limit change instruction from the RAID controller 301 (In the example, the power consumption upper limit is translated to the operation rate upper limit, and as such the operation rate upper limit is substantially handled as the power consumption upper limit, but the power consumption upper limit is not limited to the operation rate upper limit, and may be handled from another standpoint).

A number of specific examples will be explained below.

<Manual Adjustment>

(M1) The management computer 800 receives a power consumption upper limit input for the FMD unit (an aggregate of the maximum number of installable FMPKs 10) from the user via an input device. The power consumption upper limit inputted with respect to the FMD unit will be referred to below as the "upper limit of overall power consumption".

(M2) The management computer 800 receives an input from the user via an input device of an index value with respect to multiple storage area units as to how much of the upper limit of overall power consumption is to be distributed to which storage area units. The storage area unit, for example, may be at least one of an LU, a RG (RAID group), a FMD, and a FMPK. The index value, for example, may be the priority of the storage area unit, or the power consumption mode of the storage area unit (for example, a normal mode, a power saving mode, and so forth), and the index value may signify a distribution ratio, which substantially denotes how much of the upper limit of overall power consumption is to be distributed to the power consumption upper limit of the relevant storage area unit. Thus, in a case where the index value is a priority, for example, a higher-level system (at least one of the management computer 800 and the RAID controller 301) can decide the distribution ratio based on the percentage of the priority of the relevant storage area unit with respect to the total priority of the multiple storage area units. Thus, the storage area unit index value may substantially signify the distribution ratio of the power consumption upper limit. In addition, the power consumption upper limit or the operation rate upper limit may be inputted as the index value.

(M3) The management computer 800 sends a set comprising identification information and an index value for a storage area unit (and the upper limit of overall power consumption) to the RAID controller 301.

(M4) The RAID controller 301 receives the set comprising identification information and index value for a storage area unit (and the upper limit of overall power consumption) from the management computer 800 and stores this received information.

(M5) The RAID controller 301, based on the upper limit of overall power consumption and the set comprising identification information and an index value set for each storage area unit, decides the power consumption upper limit for each storage area unit. The power consumption upper limit for a storage area unit, for example, may be the product of the percentage of the index value of the relevant storage area unit relative to the total of the index values of multiple storage area units and the upper limit of overall power consumption.

(M6) The RAID controller 301 decides the operation rate upper limit of the FMPK 10 belonging to the storage area unit based on the power consumption upper limit of the storage area unit. For example, the FMPK 10 operation rate upper limit is translated from the power consumption upper limit of the storage area unit using a power control table, which will be explained further below.

(M7) The RAID controller 301 sends a setting command specifying the decided operation rate upper limit to the FMPK 10 belonging to the storage area unit.

(M8) The FM controller 20 receives the setting command from the RAID controller 301, and stores the operation rate upper limit specified in the setting command.

Thus, the user is able to configure a power consumption upper limit for a storage area unit in accordance with the application and so forth of this storage area unit. For example, the operation rate upper limit of a second LU, for which I/O performance is preferably higher than that of a first LU, is made higher than the operation rate upper limit of the first LU. In other words, adjustments to LU I/O performance can be expected in accordance with adjusting the operation rate upper limit for the LU. Instead of the power consumption upper limit of individual storage area units being decided in accordance with the upper limit of overall power consumption being distributed, the management computer 800 may input a power consumption upper limit for individual storage area units.

<Automatic Adjustment>

(A1) A higher-level system (at least one of the RAID controller 301 and the management computer 800) detects an augmentation/reduction event such as either the addition or removal of a FMPK 10. The unit for either the addition or removal, for example, may be an RG unit or a LU unit. The storage area unit is either newly augmented or reduced in accordance with the addition or removal of the FMPK 10.

(A2) In a case where the storage area unit is augmented and an index value for this storage area unit is specified from the management computer 800, since a part of the upper limit of overall power consumption is distributed to the augmented storage area unit, the permissible capacity of the power, which the existing storage area unit is able to consume, will be reduced. In a case where the storage area units are reduced, since the portion of the power, which is consumed by the reduced storage area unit(s), can be consumed by the remaining storage area units, the permissible capacity of the power, which the remaining storage area units can consume, can be increased. Therefore, in a case where the above-mentioned augmentation/reduction event has been detected, the RAID controller 301 computes the power consumption upper limit of each storage area unit subsequent to either the augmentation or the reduction based on the upper limit of overall power consumption and the index value of each storage area unit after either the augmentation or the reduction. The RAID controller 301 sends a setting command for configuring an operation rate upper limit, which conforms to the power consumption upper limit computed for the storage area unit to the FMPK 10 belonging to this storage area unit. The FM controller 20 receives this setting command, and changes the stored operation rate upper limit to the operation rate upper limit specified in this setting command.

In accordance with this, it is possible to change the operation rate upper limit of the FMPK 10 to an appropriate value in accordance with either the augmentation or reduction of the FMPK 10 even when the storage system 1 is in operation.

Figure 20:
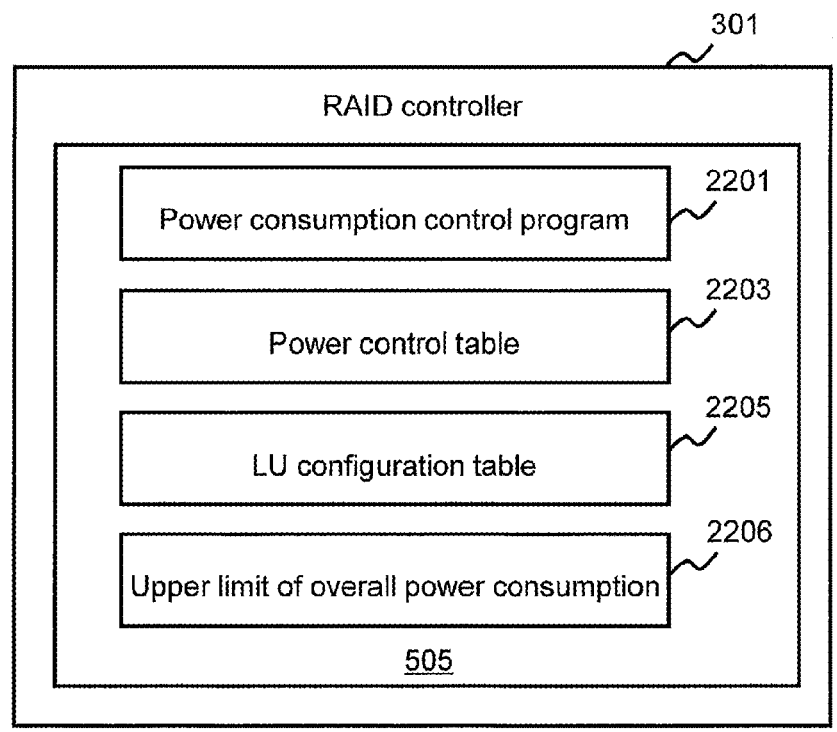
FIG. 20 shows a computer program and information stored in a memory of the RAID controller related to the example.

FIG. 20 shows a computer program and information stored in the memory 505 of the RAID controller 301.

The memory 505 stores a power consumption control program 2201, a power control table 2203, a LU configuration table 2205, and an upper limit of overall power consumption 2206.

The power consumption control program 2201 changes the operation rate upper limit configured in each FMPK 10.

The power control table 2203 comprises information denoting the corresponding relationship between the power consumption upper limit and the operation rate upper limit. Power consumption occurs as a result of factors other than the operation of the FM chip 32 (for example, the operation of the CPU 21 in the FM controller 20), but in the example, as was explained hereinabove, the power consumption of the FMPK 10 is controlled by adjusting the chip parallel operation rate. From this perspective, the operation rate upper limit may be associated with the power consumption upper limit. For example, when the value P of the power consumption upper limit of the FMPK 10 is translated to the operation rate of the FM chip 32, this value P becomes Q, but taking into account the power consumption of elements other than the FM chip 32, a value smaller than Q may be used as the operation rate upper limit of the relevant FMPK 10.

The LU configuration table 2205 comprises information related to each LU.

The upper limit of the overall power consumption 2206 is information denoting the upper limit of the overall power consumption from the management computer 800.

Figures 21, 22:
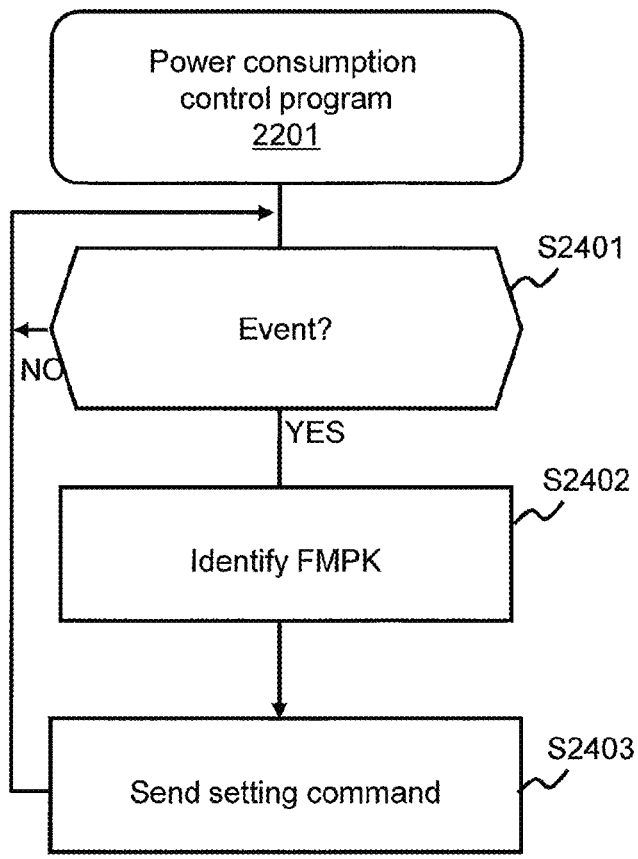
FIG. 21 shows an example of the configuration a LU configuration table related to the example.
FIG. 22 shows a flowchart of a power consumption control program related to the example.

FIG. 21 shows an example of the configuration of the LU configuration table 2205.

The LU configuration table 2205 comprises the following information for each LU:

(*) a LUN 2301, which is a LU identification number;
(*) a LU size 2302, which denotes the capacity of the LU;
(*) an area range 2303, which is information related to a range of areas constituting the basis of the LU; and
(*) an operation rate upper limit 2304, which denotes the upper limit of the rate of operation configured for the LU.

The area range 2303, for example, may comprise identification information of an RG, which constitutes the basis of the LU, the identification information of each FMPK 10 comprising this RG, and information denoting the range of logical addresses corresponding to the LU with respect to each FMPK 10 thereof. The RAID controller 301 may send a notification comprising the operation rate upper limit 2304 of the LU and the range of logical addresses corresponding to this LU to the FMPK 10, which is the basis of the LU. In accordance with this, the FM controller 20 may receive this notification, and store a set comprising the logical address range and the operation rate upper limit included in this notification. The FM controller 20 can use the logical-physical translation table 2507 to identify the FM chip comprising the physical page, which is allocated to the logical address range corresponding to the LU, and can adjust the chip parallel operation rate so as to become equal to or less than the operation rate upper limit for each logical address range (that is, each LU).

FIG. 22 shows a flowchart of the power consumption control program 2201.

In S2401, the power consumption control program 2201 determines whether or not a prescribed event has been detected. The prescribed event, for example, is the receiving from the management table 800 of a set comprising identification information (for example, a LUN) of a storage area unit and an index value (for example, a priority or an operation rate upper limit), or the augmentation/reduction event described hereinabove.

In a case where a prescribed event has been detected (S2401: YES), in S2402, the power consumption control program 2201 identifies the FMPK 10, which is the target for changing the operation rate upper limit in accordance with this event, and, in addition, identifies the post-change operation rate upper limit for each target FMPK 10. The method for identifying (computing) the operation rate upper limit is as explained hereinabove. That is, for example, the power consumption control program 2201 performs the following (a) through (c):

(a) identifies the operation rate upper limit specified by the management computer 800 for the FMPK 10 belonging to the storage area unit specified from the management computer 800;

(b) in a case where an FMPK 10 has been added, identifies the post-change operation rate upper limit of each target FMPK 10 in accordance with distributing the upper limit of overall power consumption to the existing FMPK 10 and the added FMPK 10 on the basis of the index value of the existing FMPK 10 and the index value of the added FMPK 10; and (c) in a case where an FMPK 10 has been removed, identifies the post-change operation rate upper limit of each target FMPK 10 in accordance with distributing the upper limit of overall power consumption to the remaining FMPK 10 on the basis of the index value of the remaining FMPK 10.

For example, in a case where the LU operation rate upper limit is changed, the FMPK 10, which serves as the basis of this LU, is the target FMPK 10 for changing the operation rate upper limit.

In S2403, the power consumption control program 2201 sends a setting command comprising the identified (computed) operation rate upper limit for this target FMPK 10 to each target FMPK 10.

By configuring the operation rate upper limit in FMPK 10 units beforehand, the storage controller 300 load can be reduced more than when the storage controller 300 controls the operation rate of each FMPK 10.

Figure 23:
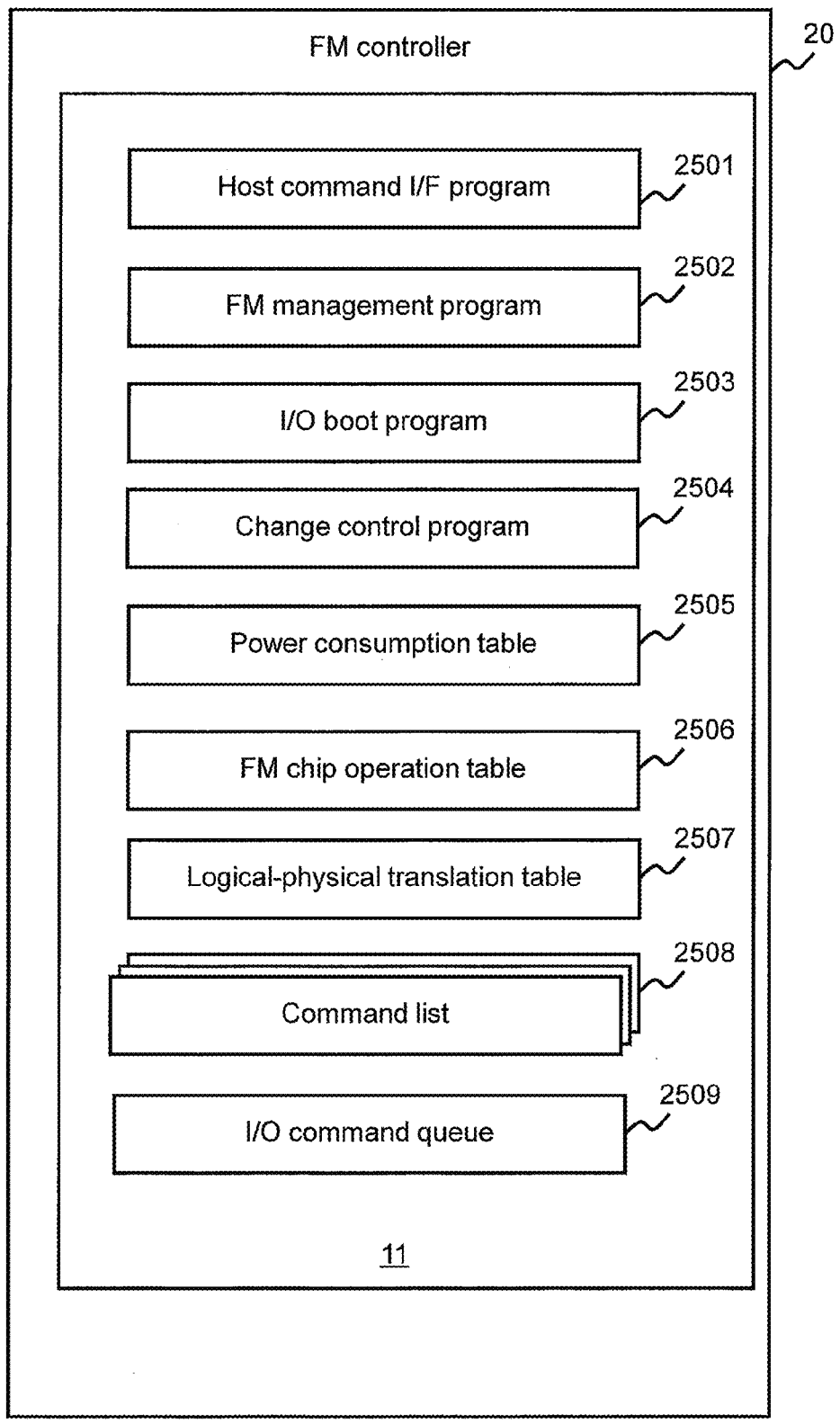
FIG. 23 shows computer programs and information stored in an FM controller DRAM related to the example.

FIG. 23 shows computer programs and information stored in the DRAM 11 of the FM controller 20. In a case where the FM controller 20 comprises a memory other than the DRAM 11, at least a portion of the computer programs and information shown in FIG. 23 may be stored in the memory other than the DRAM 11.

The DRAM 11 stores a host command I/F program 2501, a FM management program 2502, an I/O boot program 2503, a change control program 2504, a power consumption table 2505, a FM chip operation table 2506, a logical-physical translation table 2507, and a command list 2508. The DRAM 11 also comprises an I/O command queue 2509.

The host command I/F program 2501 translates an I/O command from the RAID controller 301 to a page-unit I/O command (hereinafter, page I/O command) and stores the page I/O command in the I/O command queue 2509. A host command, which is an I/O command from the RAID controller 301, is an example of a higher-level command, and a page I/O command is an example of a lower-level command.

The FM management program 2502 translates an I/O command, which conforms to an internal process, to a page I/O command, and stores the page I/O command in the I/O command queue 2509. The I/O command conforming to the internal process is an example of a higher-level command, and the page I/O command is an example of a lower-level command.

The I/O boot program 2503 fetches an I/O command from the I/O command queue 2509, and in a case where the chip parallel operation rate does not exceed the operation rate upper limit even when sending the I/O command, sends the fetched I/O command to the FM chip 32, which comprises the physical page corresponding to the physical address specified in this I/O command.

The change control program 2504 changes the operation rate upper limit stored in the power consumption table 2505 to the operation rate upper limit specified in the setting command from the RAID controller 301.

The power consumption table 2505 comprises information denoting the power consumption of a component in the FMPK 10.

The FM chip operation table 2506 denotes which FM chip is operating.

The logical-physical translation table 2507, as was explained hereinabove, denotes the corresponding relationship between a logical address (LPA) and a physical address (PPA) of each logical page.

The command list 2508 comprises information related to each page I/O command created on the basis of a single higher-level command.

The I/O command queue 2509 stores a page I/O command.

Figure 24:
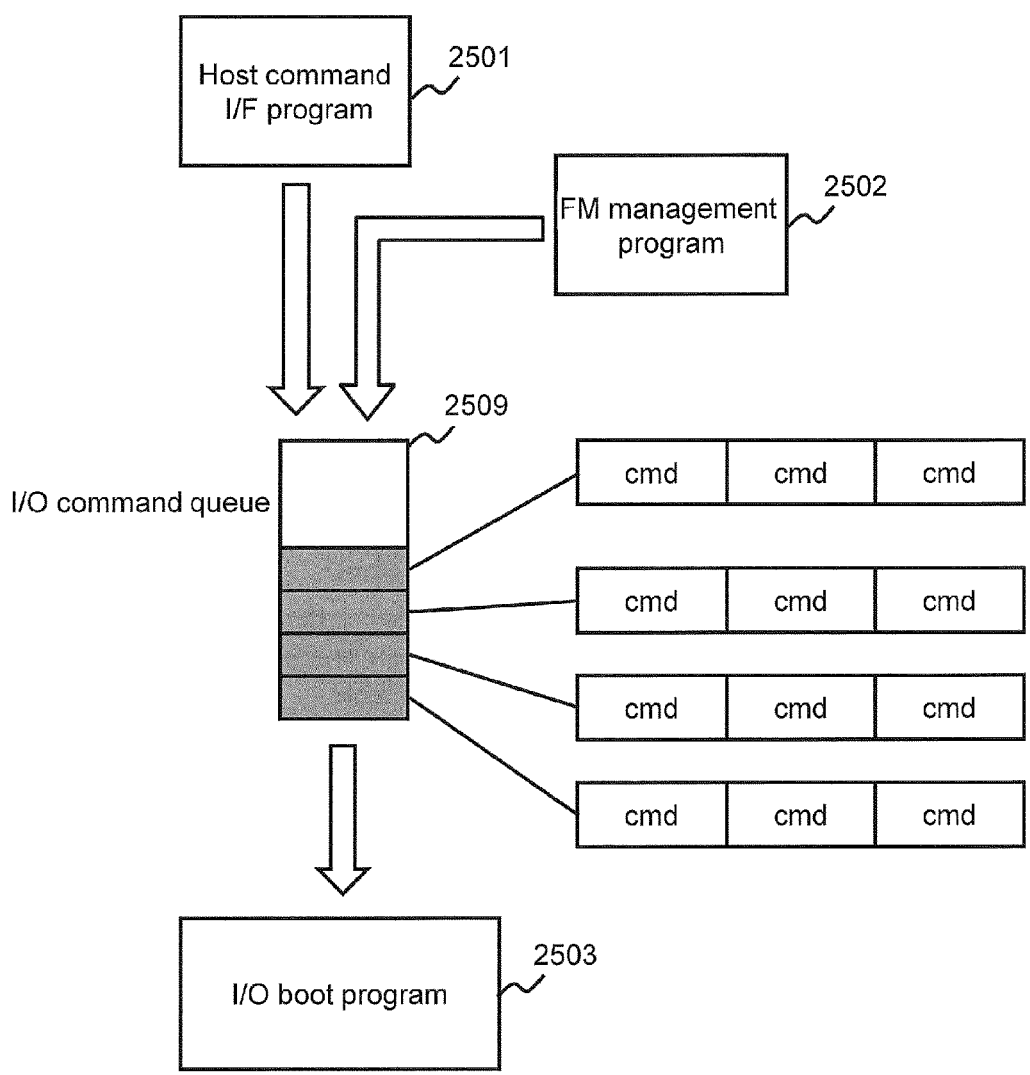
FIG. 24 shows an overview of the overall flow of I/O processing for sending a higher-level command-based page I/O command to a FM chip 32 in the example.

FIG. 24 shows an overview of the overall flow of an I/O process, which is a process for sending a higher-level command-based page I/O command to a FM chip 32.

The host command I/F program 2501 translates an I/O command from the RAID controller 301 to a page I/O command ("cmd" in FIG. 24), and stores the page I/O command in the I/O command queue 2509. Similarly, the FM management program 2502 translates an I/O command conforming to an internal process to a page I/O command, and stores the page I/O command in the I/O command queue 2509.

A page I/O command is stored in the I/O command queue 2509 for each higher-level command.

The I/O boot program 2503 fetches a page I/O command from the I/O command queue 2509. The page I/O command is fetched using units of higher-level commands. That is, in a case where multiple page I/O commands have been created on the basis of a higher-level command, multiple page I/O commands are fetched. The I/O boot program 2503 determines whether or not the chip parallel operation rate is maintained at equal to or less than the operation rate upper limit even when sending these page I/O commands. In a case where the result of this determination is affirmative, the I/O boot program 2503 sends the fetched page I/O commands. Specifically, of the multiple FM I/F control parts 24, the I/O boot program 2503 inputs the relevant I/O command into the FM I/F control part 24, which is coupled to the FM chip 32 comprising the physical page corresponding to the physical address specified in the fetched page I/O command. The FM I/F control part 24, in accordance with the inputted I/O command, performs data I/O with respect to the physical page corresponding to the physical address specified in the relevant I/O command.

An explanation of the reclamation process of FIG. 17 based on FIG. 24 would be as follows. For example, the FM management program 2502 generates one or more higher-level commands conforming to a reclamation process, and based on these one or more higher-level commands, creates a page read command group for reading valid data from each page in which valid data is stored in block #a and a page write command group for writing valid data starting from the first page of block #b, and stores these command groups in the I/O command queue 2509.

An explanation of the refresh process of FIG. 18 based on FIG. 24 would be as follows. For example, the FM management program 2502 generates one or more higher-level commands conforming to a refresh process, and based on these one or more higher-level commands, creates a page read command group for reading valid data from each page in which valid data is stored in block #c and a page write command group for writing valid data starting from the first page of block #d, and stores these command groups in the I/O command queue 2509.

Figure 25:
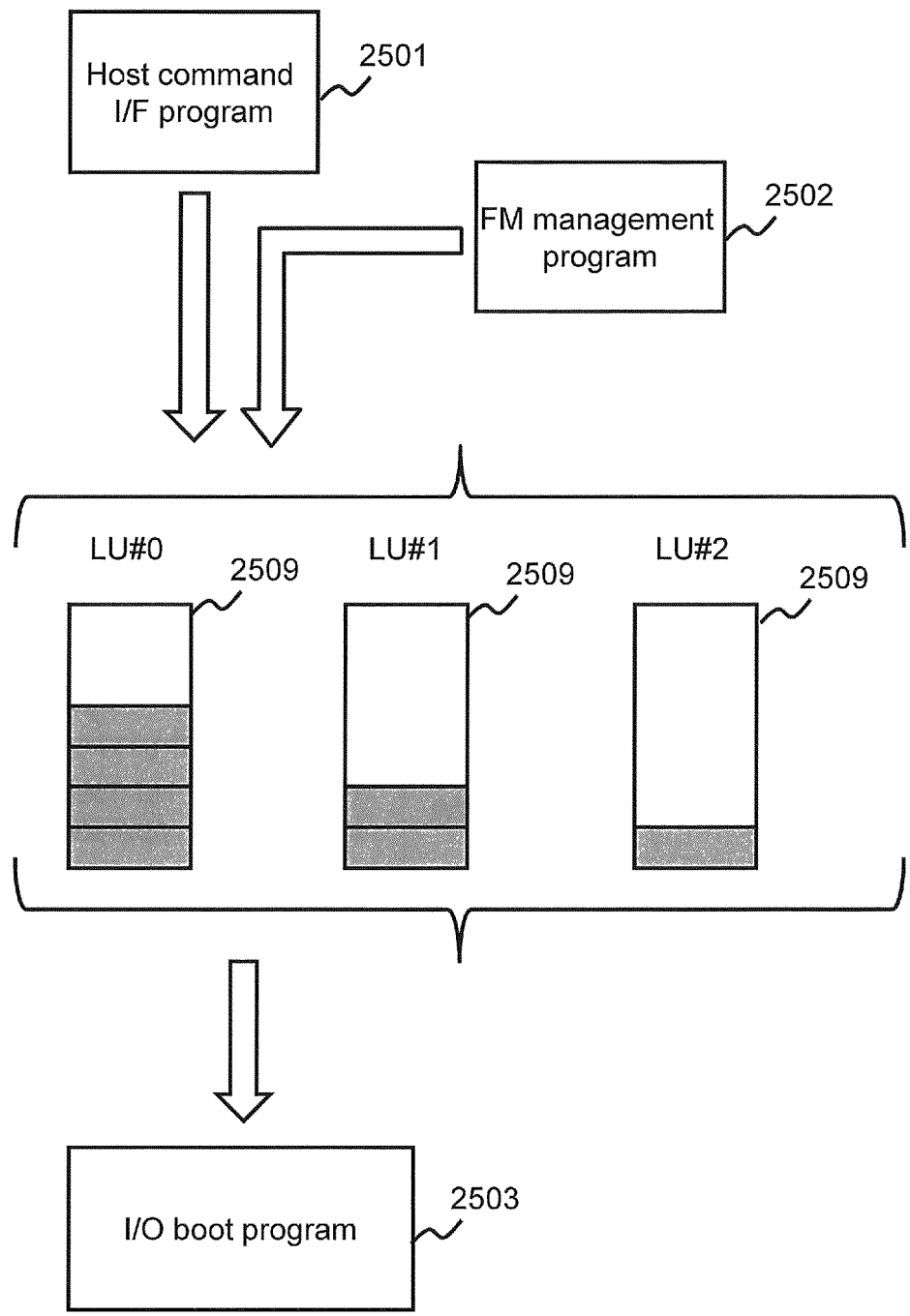
FIG. 25 shows an overview of the overall flow of I/O processing in FIG. 24 in a case where an I/O command queue exists for each LU.

FIG. 25 shows an overview of the overall flow of I/O processing in a case where an I/O command queue 2509 exists for each LU in FIG. 24.

The host command I/F program 2501 and the FM management program 2502 identify a LU corresponding to a logical address range to which a logical address specified in a higher-level command belongs, and identify, from multiple I/O command queues 2509, which respectively correspond to multiple LUs, the I/O command queue 2509 corresponding to the identified LU. The host command I/F program 2501 and the FM management program 2502 store page I/O commands in the identified I/O command queue 2509.

The I/O boot program 2503 fetches an I/O command from the I/O command queue 2509, and determines whether or not the chip parallel operation rate, which corresponds to the LU logical address range corresponding to this I/O command queue 2509, is equal to or less than the operation rate upper limit of this LU even when sending these I/O commands. In a case where the result of this determination is affirmative, the I/O boot program 2503 sends the fetched I/O command. The I/O boot program 2503 may switch the I/O command queue 2509 from which the I/O command is fetched in round-robin fashion, or may switch the I/O command queue 2509 from which the I/O command is fetched on the basis of the operation rate upper limit of the LU (the LU priority). For example, I/O commands may be fetched more frequently from an I/O command queue 2509, which corresponds to a LU with a high operation rate upper limit.

FIG. 26 shows an example of the configuration of the command list 2508.

The command list 2508 is created for each higher-level command. The command list 2508 comprises information related to all the page I/O commands created based on a higher-level command. The command list 2508 comprises the following information for each page I/O command:

(*) a command type 2801, which denotes the type of page I/O command;

(*) a LPA 2802, which denotes a logical page address corresponding to an I/O-destination physical page conforming to the page I/O command;

(*) a buffer address 2803, which denotes a buffer location in which data read from a physical page of the flash memory in accordance with the page I/O command is stored;

(*) a PPA 2804, which denotes the address of the I/O-destination physical page conforming to the page I/O command; and (*) a chip number 2805, which is the number of the FM chip comprising the I/O-destination physical page conforming to the page I/O command.

The host command I/F program 2501 and the FM management program 2502, on the basis of a higher-level command, create a command list 2508, which is a page I/O command list, and store this command list 2508 in the I/O command queue 2509. In so doing, the host command I/F program 2501 and the FM management program 2502 reserve an area on the DRAM 11 for storing data read from a physical page of the flash memory in accordance with respective page I/O commands, and store this address in the buffer address 2803 of the command list 2508.

In the case of a data overwrite with respect to the same logical page, it is necessary to read data from the physical page corresponding to this logical page, to update this data, and to write the post-update data to a physical page newly allocated to the relevant logical page. For this reason, with respect to the higher-level command for the data overwrite, a read page I/O command is created in addition to a write page I/O command as the page I/O commands corresponding to the higher-level command, and as such, both "READ" and "WRITE" are entered as the command type 2801.

FIG. 27 shows an example of the configuration of the power consumption table 2505.

The power consumption table 2505 comprises the following information for a power-consuming element of a FMPK 10:

(*) a component name 2901, which is the name of an element;

(*) a power 2902, which denotes the power consumed per element;

(*) a number installed 2903, which denotes the number of elements existing in the FMPK 10;

(*) a number in operation 2904, which denotes the number of elements in operation of the elements existing in the FMPK 10; and (*) a power subtotal 2905, which denotes the power (that is, the product of the power 2902 and the number in operation 2904) being consumed by the elements in operation.

The power consumption table 2505 comprises a total power 2906, which denotes the total of the power subtotal 2905 corresponding to all the elements, and an operation rate upper limit 2907 for the FMPK 10 comprising this table 2505.

The value of the power 2902 may be a predetermined value, or may be a measured value. In addition, information related to an element other than the FM chip 32 may be stored in the power consumption table 2505. A number installed 2903 and a number in operation 2904 for a FM chip 32, and an operation rate upper limit 2907 may exist for each logical address range corresponding to a storage area unit (for example, a LU). The chip parallel operation rate is the ratio of the number in operation 2904 of the FM chip 32 relative to the number installed 2903 of the FM chip 32.

FIG. 28 shows an example of the configuration of the FM chip operation table 2506.

The FM chip operation table 2506 comprises the following information for each FM chip 32:

(*) a chip number 3001, which is the number of a FM chip;

(*) an execution in progress 3002, which denotes whether or not the relevant FM chip is executing a command (is in operation);

(*) a next command 3003, which denotes whether or not the relevant FM chip is the destination of the next page I/O command group (one or more page I/O commands fetched the earliest from the I/O command queue 2509); and (*) a prospect 3004, which denotes whether or not the relevant FM chip is expected to be executing a command (be in operation) when the next page I/O command group is sent.

The execution in progress 3002 is "1" for a FM chip 32 which is executing a command (in operation), and is "0" for a FM chip 32 which is not executing a command (not in operation). As used here, "execution in progress (in operation)" signifies that the FM chip 32 is in the midst of processing a page I/O command, and is the destination of a page I/O command, which has been fetched from the I/O command queue 2509.

The next command 3003 is "1" for a FM chip 32, which is the destination of the next page I/O command, and is "0" for a FM chip 32, which is not the destination of the next page I/O command.

For each FM chip 32, the prospect 3004 is the logical OR of the execution in progress 3002 and the next command 3003. In the example, the chip parallel operation rate is the ratio of the number of FM chips 32 with a prospect 3004 of "1" relative to the number installed 2903 (refer to FIG. 27) of the FM chip 32. The number in operation 2904 for the FM chip 32 shown in FIG. 27 is the number of FM chips 32 with the prospect 3004 of "1". Therefore, as explained hereinabove, the chip parallel operation rate is the ratio of the number in operation 2904 of the FM chip 32 relative to the number installed 2903 of the FM chip 32.

Figure 29:
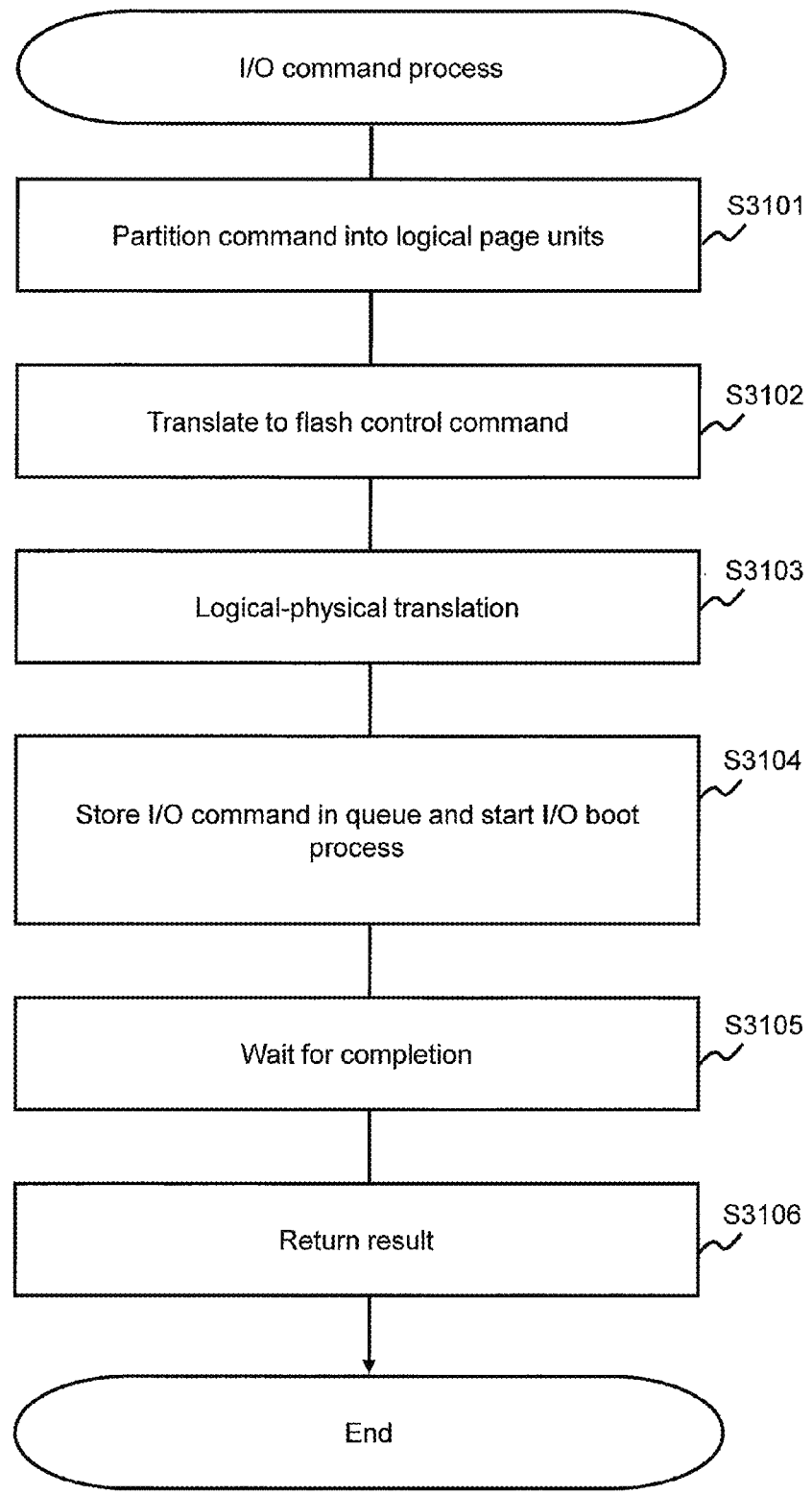
FIG. 29 shows a flowchart of an I/O command process related to the example.

FIG. 29 shows a flowchart of an I/O command process.

This I/O command process is performed by the host command I/F program 2501 and the FM management program 2502 in a case where an I/O command (the "higher-level I/O command" in FIG. 29) has been generated as the higher-level command.

In S3101, the program 2501 (2502) divides the higher-level I/O command into I/O commands of logical page units.

In S3102, the program 2501 (2502) translates the logical page unit I/O command into a flash control command (that is, a page I/O command, which is a command capable of being interpreted by the FM I/F control part 24).

In S3103, the program 2501 (2502) uses the logical-physical translation table 2507 to translate the logical page address into a physical page address for the page I/O command.

In S3104, the program 2501 (2502) creates a command list 2508 corresponding to the higher-level I/O command and stores this list 2508 in the DRAM 11, and, in addition, stores the page I/O command group (all of the page I/O commands) corresponding to the higher-level I/O command in the I/O command queue 2509, and starts the I/O boot process. In a case where there is an I/O command queue 2509 for each storage area unit (for example, LU), the program 2501 (2502) stores the page I/O command group in the queue 2509 corresponding to this storage area unit.

In S3105, the program 2501 (2502) waits for the completion of the I/O for each page I/O command stored in S3104.

In S3106, the program 2501 (2502) returns the result of the higher-level I/O command corresponding to the page I/O command group stored in S3104 to the source of the higher-level I/O command. In a case where the higher-level I/O command is an I/O command conforming to an internal process, the S3106 need not be performed. In a case where the completion of the I/O has been notified for each page I/O command stored in S3104, in S3106, higher-level I/O command complete may be returned.

Figure 30:
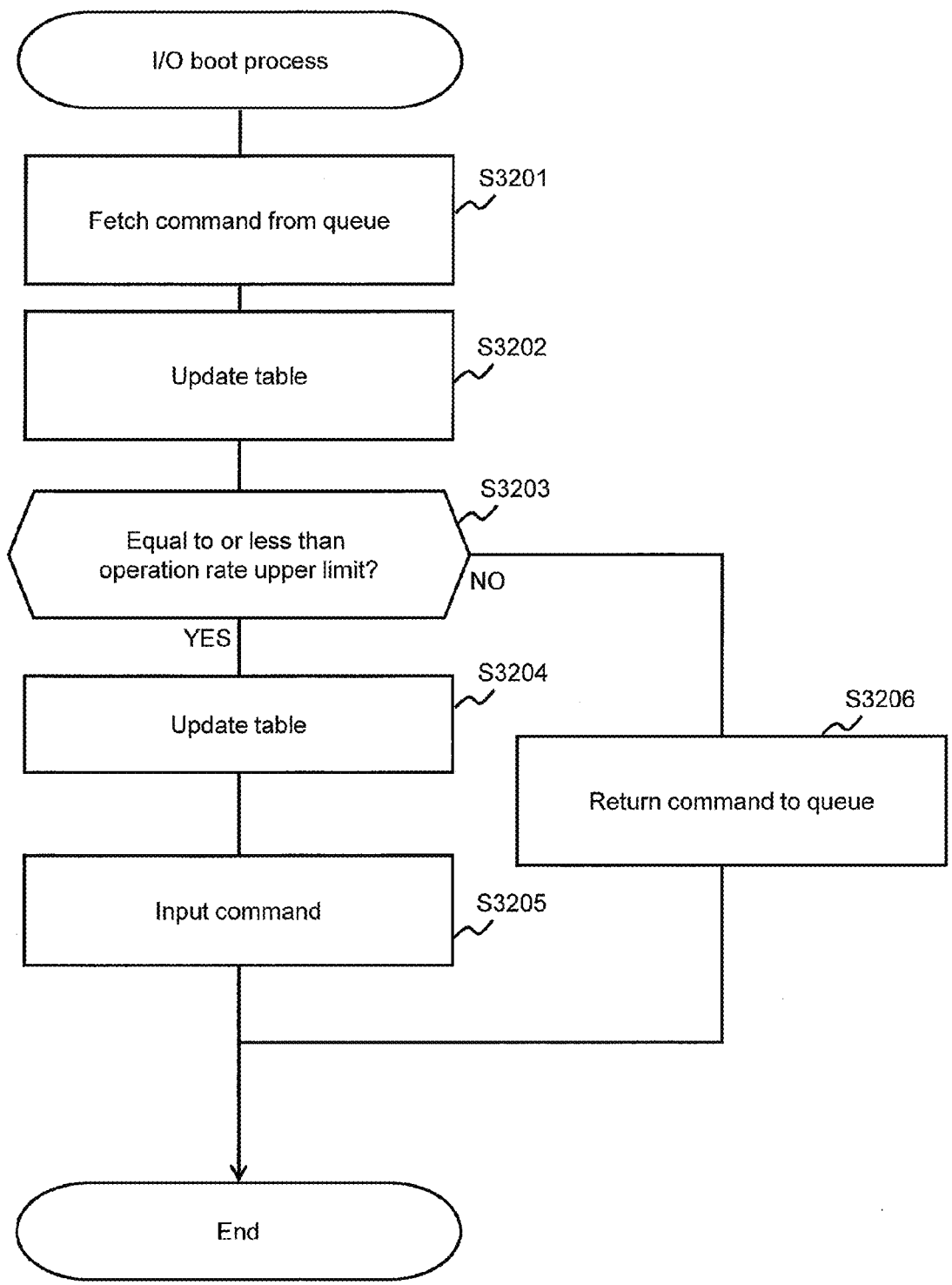
FIG. 30 shows a flowchart of an I/O boot process related to the example.

FIG. 30 shows a flowchart of the I/O boot process.

The I/O boot process is performed by the I/O boot program 2503.

In S3201, the I/O boot program 2503 fetches the command list 2508 from the start of the I/O command queue 2509.

In S3202, the I/O boot program 2503 updates the FM chip operation table 2506. Specifically, for example, the I/O boot program 2503 performs the following updates:

(X1) Updates to "1" only the bit of the next command 3003, which corresponds to the chip number 2805 included in each page I/O command of the fetched command list 2508; and (X2) subjects the next command 3003 created in (X1) and each bit of the execution in progress 3002 to an exclusive OR (XOR), and stores the result thereof in the prospect 3004.

In S3203, the I/O boot program 2503 computes the ratio of the number installed 2903 relative to the number of chips for which "1" is stored in the prospect 3004 of the FM chip operation table 2506, and determines whether or not this chip parallel operation rate is equal to or less than the operation rate upper limit 2907.

In a case where the result of the determination of S3203 is affirmative (S3203: YES), in S3204, the I/O boot program 2503 updates the power consumption table 2505 and the FM chip operation table 2506. With respect to the power consumption table 2505, the I/O boot program 2503 updates the number in operation 2904, the power subtotal 2905, and the total power 2906 for the FM chip 32, and with respect to the FM chip operation table 2506, copies the next command 3003 to the execution in progress 3002. Thereafter, in S3205, the I/O boot program 2503 inputs each fetched page I/O command to the FM I/F control part 24 coupled to the destination chip 32 of this page I/O command.

In a case where the result of the determination of S3203 is negative (S3203: NO), in S3206, the I/O boot program 2503 returns the fetched page I/O command group to the fetch-source I/O command queue 2509. According to the I/O boot process, multiple FM chips 32 are operated to the fullest in parallel in a range within which the chip parallel operation rate does not exceed the operation rate upper limit 2907. Also, in S3201, the I/O boot program 2503 may, without fetching, reference the command list 2508, and may fetch the command list 2508 after obtaining an affirmative determination result in S3203.

Figure 31:
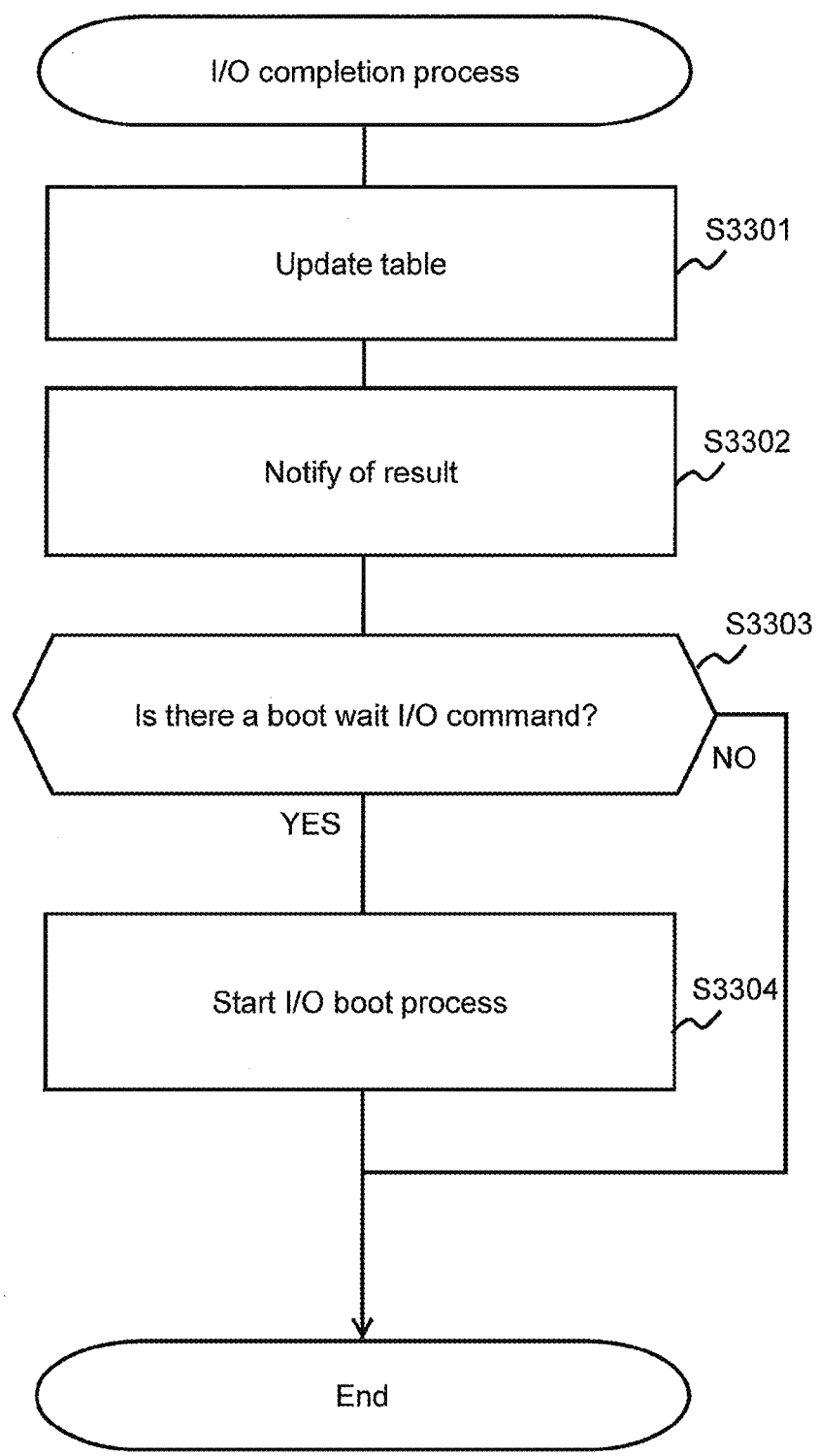
FIG. 31 shows a flowchart of an I/O completion process related to the example.

FIG. 31 shows a flowchart of an I/O completion process.

The I/O completion process is performed by the I/O boot program 2503 in a case where the processing of a page I/O command group (or at least one page I/O command) has been completed.

In S3301, the I/O boot program 2503 updates the power consumption table 2505 and the FM chip operation table 2506. Specifically, for example, the I/O boot program 2503 performs the following updates:

(Y1) Configures the execution in progress 3002 of the destination chip 32 of the completed page I/O command group to "0" in the FM chip operation table 2506; and (Y2) subtracts the number of chips for which the execution in progress 3002 was updated to "0" in the above (Y1) from the number in operation 2904 of the power consumption table 2505, and updates the power subtotal 2905 and the total power 2906 in accordance therewith.

In S3302, the I/O boot program 2503 notifies either program 2501 or 2502, which generated the higher-level I/O command corresponding to the completed page I/O command group.

In S3303, the I/O boot program 2503 determines whether or not a boot-waiting page I/O command group is in the I/O command queue 2509 (whether or not there is a command list 2508 corresponding to a page I/O command group, which has not been fetched).

In a case where the result of the determination of S3303 is affirmative (S3303: YES), in S3304, the I/O boot program 2503 starts the I/O boot process.

Figure 32:
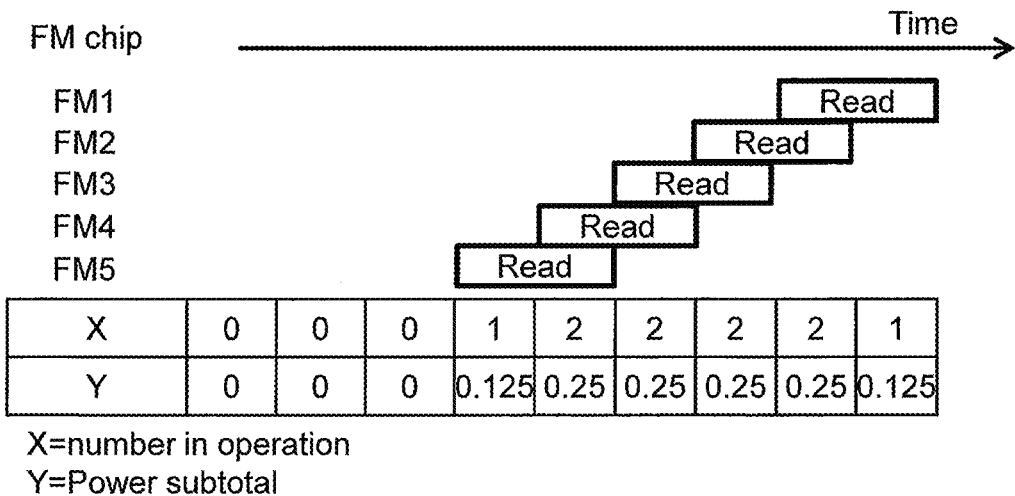
FIG. 32 shows an example of a read process in a state in which a chip parallel operation rate is maintained equal to or less than an operation rate upper limit in the example.
Figure 33:
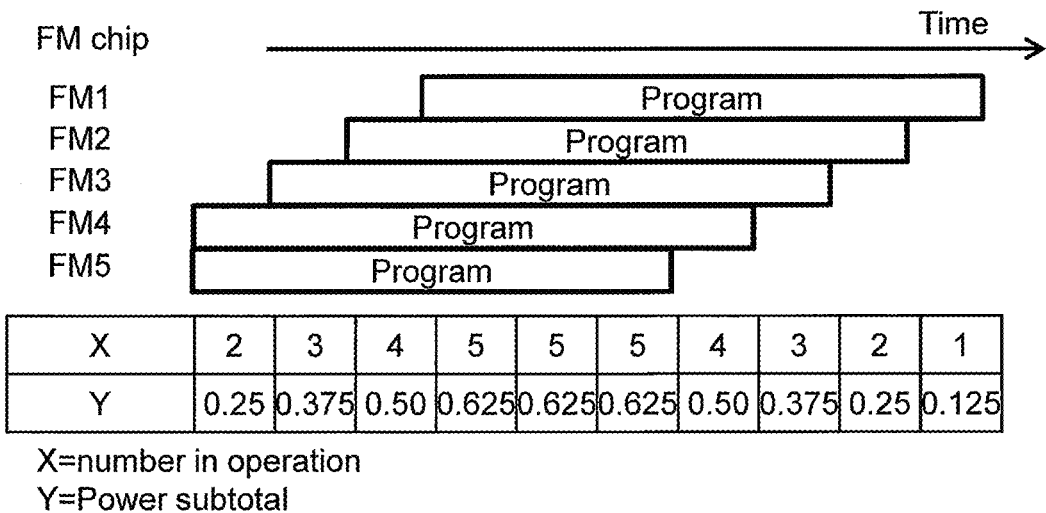
FIG. 33 shows an example of a programming process (write process) in a state in which the chip parallel operation rate is maintained equal to or less than the operation rate upper limit in the example.

According to the explanations given by referring to FIGS. 29 through 31, a read process is performed in a range within which the chip parallel operation rate is maintained at equal to or less than the operation rate upper limit as shown in the FIG. 32, and a program process (write process) is performed in a range within which the chip parallel operation rate is maintained at equal to or less than the operation rate upper limit as shown in the FIG. 33. For example, according to FIG. 33, in a case where the upper limit of the number of chips in parallel operation (the number of FM chips 32 operating in parallel at the same time) is 5, the number of chips in parallel operation is maintained at equal to or less than 5 in accordance with the operation rate upper limit.

Figure 34:
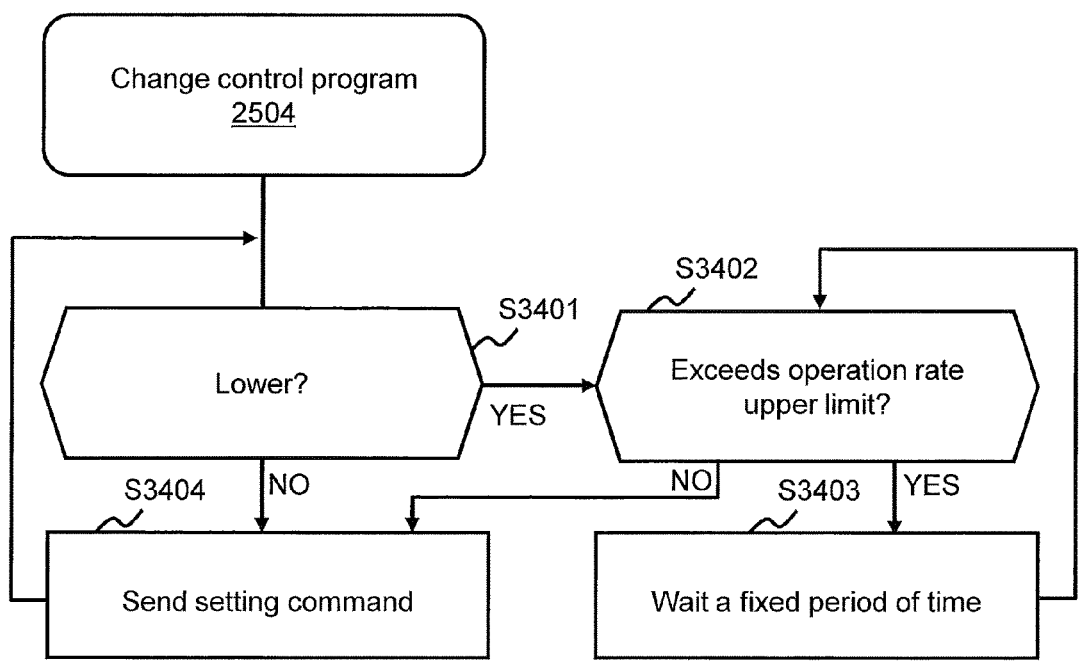
FIG. 34 shows a flowchart of processing for controlling a change in the operation rate upper limit in the example.

FIG. 34 shows a flowchart of a process for controlling an operation rate upper limit change.

This process is performed by the change control program 2504 in a case where the FM controller 20 has received a setting command from the RAID controller 301.

In S3401, the change control program 2504 determines whether or not the operation rate upper limit specified in the setting command is smaller than the operation rate upper limit 2907 of the power consumption table 2505.

In a case where the result of the determination in S3401 is affirmative (S3401: YES), in S3402, the change control program 2504 determines whether or not the chip parallel operation rate (the ratio of the number in operation 2904 relative to the number installed 2903 of the FM chip 32) exceeds the operation rate upper limit specified in the setting command.

In a case where the result of the determination in S3402 is affirmative (S3402: YES), in S3403, the change control program 2504 waits for a fixed period of time before reexecuting S3402.

In a case where the result of the determination in S3402 is negative (S3402: NO), or a case where the result of the determination in S3401 is negative (S3401: NO), in S3404, the change control program 2504 changes the operation rate upper limit 2907 of the power consumption table 2505 to the operation rate upper limit specified in the setting command.

One example has been explained above, but it goes without saying that the present invention is not limited to this example, and that various changes are possible without departing from the gist thereof.

For example, the number of parallel commands in the FMPK 10 may be controlled by also taking into account the power consumption of an element other than the FM chip 32 in this FMPK 10 (for example, the CPU 21) in addition to the operation rate upper limit.

In addition, the power consumption table 2505 and the FM chip operation table 2506 may exist for each storage area unit (for example, LU). In accordance with this, information related to the FM chip, which belongs to a range of physical areas allocated to the storage area unit, is stored in the FM chip operation table corresponding to the storage area unit. When adjusting the chip parallel operation rate for each storage area unit, this adjustment is performed in accordance with the processing described hereinabove based on an I/O command queue corresponding to the storage area unit, a FM chip operation table corresponding to the storage area unit, and a power consumption table corresponding to the storage area unit.

In the above-described example, the memory module in which multiple FM chips 32 are mounted is a DIMM 30, but a memory module other than a DIMM may be used.

In the above-described example, multiple FM chips 32 in the same DIMM 30 are coupled to the same CE signal line 27, but multiple FM chips 32 in different DIMMs 30 may be coupled to the same CE signal line 27.

In the above-described example, it is possible to write multiple data elements to multiple FM chips 32 in parallel in the FMPK 10. That is, a large amount of data can be written at a time. For this reason, the RAID controller 301 can exercise control so as to make the amount of data in the FMPK 10 (or the amount of transfer unit data in a data transfer between FMPKs 10) larger than the amount of transfer unit data in a data transfer involving a type of storage device other than the FMPK 10 (for example, HDD (SAS) 600 or HDD (SATA) 700).

Figure 36:
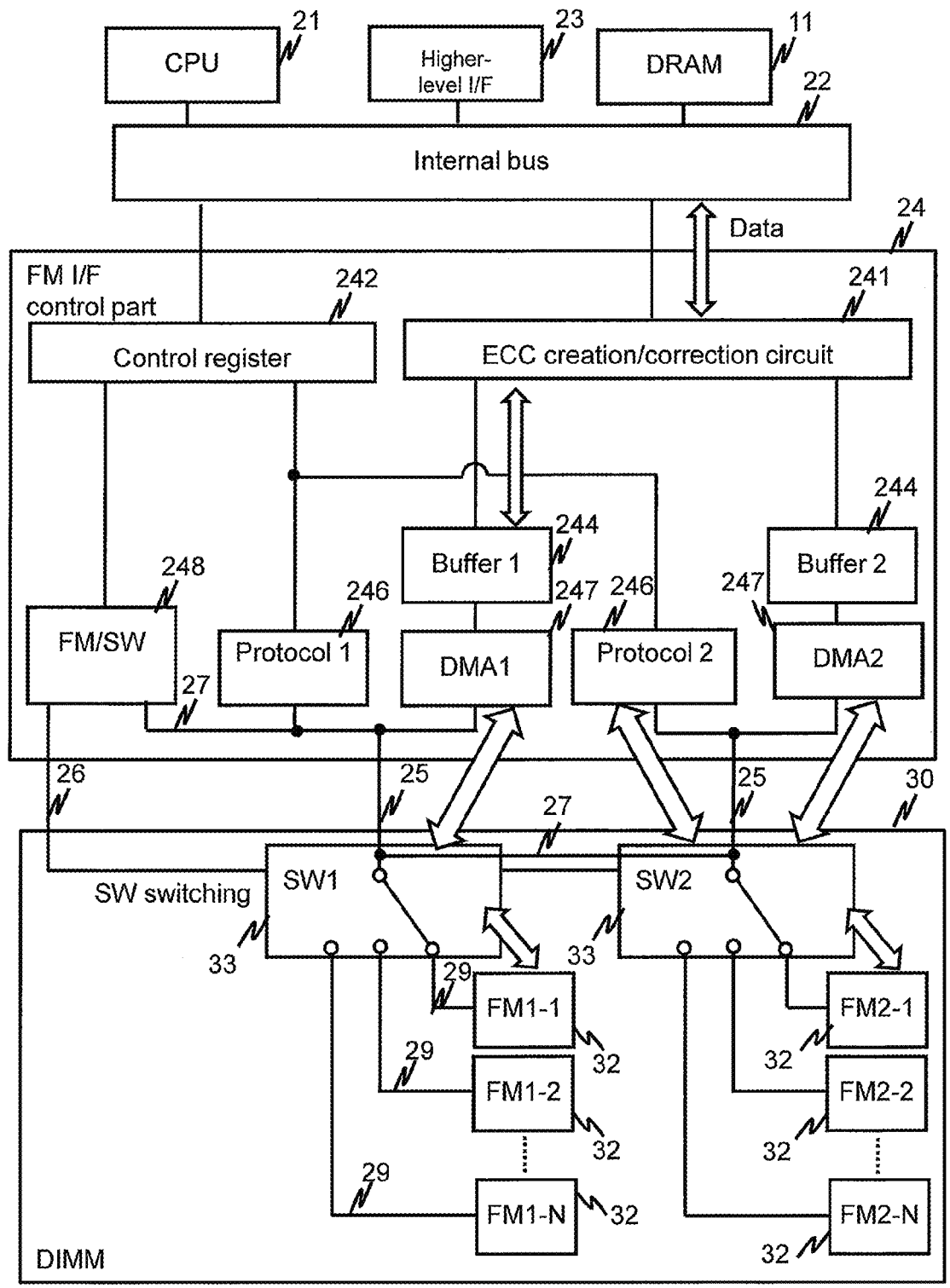
FIG. 36 shows an example of another detailed configuration of a portion of the FMPK related to the example.

In addition, for example, the configuration of the FMPK 10 may be the configuration shown in FIG. 36. The FMPK shown in FIG. 36 makes it possible for the CE signal line 27 to also be switched using SW 33. The CE signal line 27 is coupled to a FM/SW 248. The CE signal line 27 is coupled to a bus 25 as well as to a SW #1. The CE signal line 27 is also coupled to a SW #2. The SWs 33 (#1 and #2) are coupled to multiple FM chips 32 via a bus 29 comprising a CE signal line and a data bus. The SW 33 selectively couples any one of multiple buses 29 to the bus 25 and the CE signal line 27 based on a switching signal supplied by a switching signal line 26. According to this configuration, the number of output CE signal lines 27 in the FM I/F control part 24 can be reduced, enabling the chip size of the FM I/F control part 24 to be made smaller.

REFERENCE SIGNS LIST

1 Storage system
10 FMPK (flash memory package)
400 Flash memory unit (FMU)

The invention claimed is:

1. A storage system, comprising:
multiple memory packages, which respectively comprise multiple non-volatile semiconductor memory devices for storing data, and a memory controller for controlling data read/write from/to the relevant multiple semiconductor memory devices; and
a storage controller, which receives an I/O command issued from a host computer, creates, on the basis of the relevant I/O command, a first level command for controlling the multiple memory packages, and sends the first level command to the multiple memory packages,
wherein each of the memory controllers:
creates a second level command for the multiple nonvolatile semiconductor memory devices in a memory package of each of the memory controllers based on the first level command;
estimates power to be consumed in the memory package of each of the memory controllers when the second level command is executed; and
in a case where the estimated power consumption exceeds a preconfigured permissible power, suspends the execution of the second level command.

2. A storage system according to claim 1, wherein the storage controller:
configures a RAID group using the multiple memory packages, and provides the host computer with multiple LUs from the relevant RAID group; and
acquires, based on an index of a power in LU units specified by a management computer, the permissible power in each of the multiple memory packages for each relevant specified LU, and configures the relevant acquired power in each of the memory packages as the permissible power for the relevant specified LU in the memory package of each of the memory controllers, and
each of the memory controllers:
estimates the power to be consumed in the memory package of each of the memory controllers when the second level command is executed for each LU specified in the second level command; and
in a case where the estimated power consumption in LU units exceeds the preconfigured the power consumption for a specified LU, suspends the execution of the second level command specifying the relevant LU.

3. A storage system according to claim 1, wherein each of the memory controllers estimates the power to be consumed based on the number of the nonvolatile semiconductor memory devices, which transition to an operational state in accordance with the execution of the second level command.

4. A storage system according to claim 1, wherein the second level command comprises a command created for each of the memory controllers to perform the memory package internal processing independently of the first level command.

5. A storage system according to claim 1, wherein the storage controller acquires, on the basis of an index of power specified by a management computer, an permissible power in each of the multiple memory packages, and configures the relevant acquired power in each of the memory packages as the permissible power.

6. A storage system according to claim 1, wherein the memory controller estimates the power to be consumed on the basis of a sum of the number of the nonvolatile semiconductor memories currently operating inside the memory controller, and the number of the nonvolatile semiconductor memories, which operate in accordance with executing the second level command.

7. A memory package, comprising:
multiple nonvolatile semiconductor memory devices which store data, and which are coupled to a higher-level apparatus, which issues a first level command for controlling a data I/O; and
a memory controller for controlling data read/write from/to the relevant multiple semiconductor memory devices,
wherein the memory controller:
creates a second level command for the multiple nonvolatile semiconductor memory devices based on the first level command;
estimates power to be consumed when the second level command is executed; and
in a case where the estimated power consumption exceeds a preconfigured permissible power, suspends the execution of the second level command.

8. A memory package according to claim 7, wherein
the memory package, together with another memory package, comprises a RAID group for providing multiple LUs, and
the memory controller:
receives from the higher-level apparatus, on the basis of an index of power in LU units specified by a management computer, power for each of the relevant specified LUs allowable in each of the memory packages comprising the relevant RAID group;
configures the relevant received power as the permissible power for the relevant specified LU in the memory package of each of the memory controllers;
estimates the power to be consumed in the memory package of each of the memory controllers when the second level command is executed for each LU specified in the second level command; and
in a case where the estimated power consumption in LU units exceeds a preconfigured power consumption for a specified LU, suspends the execution of the second level command specifying the relevant LU.

9. A memory package according to claim 7, wherein the memory controller estimates the power to be consumed based on the number of the nonvolatile semiconductor memory devices, which transition to an operational state in accordance with the execution of the second level command.

10. A memory package according to claim 7, wherein the second level command comprises a command created for the memory controller to perform the memory package internal processing independently of the first level command.

11. A memory package according to claim 7, wherein the memory controller estimates the power to be consumed on the basis of a sum of the number of the nonvolatile semiconductor memories and the number of the nonvolatile semiconductor memories, which operate in accordance with the execution of the second level command.

12. A control method for a storage system, which comprises: multiple memory packages comprising multiple nonvolatile semiconductor memory devices for storing data and a memory controller for controlling data read/write from/to the relevant multiple semiconductor memory devices; and a storage controller, which receives an I/O command issued from a host computer, creates, on the basis of the relevant I/O command, a first level command for controlling the multiple memory packages, and sends the first level command to the multiple memory packages, the storage system control method comprising the steps of:
acquiring, on the basis of an index of power specified by a management computer, an permissible power for each of the multiple memory packages;
configuring the relevant acquired power for each of the memory packages as the permissible power;
creating, based on the first level command, a second level command for the multiple nonvolatile semiconductor memory devices inside the memory package;
estimating power to be consumed in a memory package when the second level command is executed; and
suspending the execution of the second level command in a case where the estimated power consumption exceeds a preconfigured permissible power.

13. A storage system control method according to claim 12, wherein the control method further comprising the steps of:
configuring a RAID group using the multiple memory packages and providing the host computer with multiple LUs from the relevant RAID group;
acquiring, based on an index of power in LU units specified by a management computer, an permissible power for each of the multiple memory packages for each relevant specified LU, and configuring the relevant acquired power as the permissible power for the relevant specified LU in the memory package;
estimating the power to be consumed in the memory package when the second level command is executed for each LU specified in the second level command; and
in a case where the estimated power consumption in LU units exceeds a preconfigured power consumption for a specified LU, suspending the execution of the second level command specifying the relevant LU.

14. A storage system control method according to claim 12, wherein the control method further comprising the step of:
the second level command comprising a command created for each of the memory controllers to perform the memory package internal processing independently of the first level command.

15. A storage system control method according to claim 12, wherein the control method further comprising the step of:
estimating the power to be consumed on the basis of a sum of the number of the nonvolatile semiconductor memories currently operating inside the memory controller and the number of the nonvolatile semiconductor memories, which operate in accordance with the execution of the second level command.

* * * * *